United States Patent
Finnerty et al.

(10) Patent No.: US 9,774,050 B2
(45) Date of Patent: Sep. 26, 2017

(54) APPARATUS AND METHODS FOR MIXING REFORMABLE FUELS AND AN OXYGEN-CONTAINING GAS AND/OR STEAM

(71) Applicant: WATT Fuel Cell Corp., Mount Pleasant, PA (US)

(72) Inventors: Caine Finnerty, Mount Pleasant, PA (US); Paul DeWald, Scottdale, PA (US)

(73) Assignee: WATT Fuel Cell Corp., Mount Pleasant, PA (US)

( * ) Notice: Subject to any disclaimer, the term of this patent is extended or adjusted under 35 U.S.C. 154(b) by 72 days.

(21) Appl. No.: 14/335,463

(22) Filed: Jul. 18, 2014

(65) Prior Publication Data

US 2015/0024297 A1   Jan. 22, 2015

Related U.S. Application Data

(60) Provisional application No. 61/847,833, filed on Jul. 18, 2013.

(51) Int. Cl.
| | |
|---|---|
| *H01M 8/06* | (2016.01) |
| *H01M 8/0606* | (2016.01) |
| *B01J 19/26* | (2006.01) |
| *B01J 4/00* | (2006.01) |
| *B01F 3/02* | (2006.01) |
| *H01M 8/04082* | (2016.01) |
| *B01J 19/00* | (2006.01) |
| *B01F 5/04* | (2006.01) |
| *H01M 8/0612* | (2016.01) |
| *C01B 3/38* | (2006.01) |

(52) U.S. Cl.
CPC ............. *H01M 8/0606* (2013.01); *B01F 3/02* (2013.01); *B01F 5/0415* (2013.01); *B01F 5/0421* (2013.01); *B01J 4/002* (2013.01); *B01J 19/006* (2013.01); *B01J 19/0073* (2013.01); *B01J 19/26* (2013.01); *H01M 8/04201* (2013.01); *B01F 2005/0446* (2013.01); *B01J 2219/00065* (2013.01); *B01J 2219/00162* (2013.01); *B01J 2219/00772* (2013.01); *C01B 3/38* (2013.01); *C01B 2203/1282* (2013.01); *H01M 8/0612* (2013.01); *Y02P 20/149* (2015.11)

(58) Field of Classification Search
CPC . B01J 19/006; B01J 19/26; B01J 4/002; B01J 19/0073; B01J 2219/00065; B01J 2219/00162; B01J 2219/00772; B01F 5/0415; B01F 5/0421; B01F 3/02; B01F 2005/0446; H01M 8/0606; H01M 8/04201; C01B 3/38; C01B 2203/1282
See application file for complete search history.

(56) References Cited

U.S. PATENT DOCUMENTS

| | | | |
|---|---|---|---|
| 2,361,150 A | 10/1944 | Petroe | |
| 5,525,242 A | 6/1996 | Kerecz | |
| 5,997,596 A | 12/1999 | Joshi et al. | |
| 7,381,229 B2 | 6/2008 | Lawrence | |

(Continued)

*Primary Examiner* — Muhammad Siddiquee
(74) *Attorney, Agent, or Firm* — Goodwin Procter LLP

(57) ABSTRACT

The present teachings provide apparatus and methods for mixing a reformable fuel and/or steam with an oxygen-containing gas and/or steam to provide a gaseous reforming reaction mixture suitable for reforming with a reformer and/or a fuel cell stack of a fuel cell unit and/or fuel cell system.

20 Claims, 9 Drawing Sheets

(56) References Cited

U.S. PATENT DOCUMENTS

| | | |
|---|---|---|
| 7,709,117 B2 | 5/2010 | Lee et al. |
| 7,931,992 B2 | 4/2011 | Larrain et al. |
| 8,586,252 B2 | 11/2013 | Fernandes et al. |
| 2002/0155331 A1* | 10/2002 | Kamegaya ........ H01M 8/04223 429/412 |
| 2003/0234455 A1 | 12/2003 | Mieney et al. |
| 2004/0113288 A1* | 6/2004 | Korzeniowski ....... B01F 3/0446 261/76 |
| 2004/0265224 A1* | 12/2004 | Papavassiliou .......... B01J 4/002 423/651 |
| 2005/0019623 A1* | 1/2005 | Shoji .................... B01F 5/0682 48/198.7 |
| 2005/0133615 A1* | 6/2005 | Gopalan ............. B01F 3/04503 239/88 |
| 2009/0065957 A1 | 3/2009 | Mao et al. |
| 2013/0180595 A1 | 7/2013 | Naunheimer et al. |

\* cited by examiner

APPARATUS AND METHODS FOR MIXING REFORMABLE FUELS AND AN OXYGEN-CONTAINING GAS AND/OR STEAM

CROSS REFERENCE TO RELATED APPLICATIONS

This application claims priority to and the benefit of the filing date of U.S. Provisional Patent Application No. 61/847,833, filed on Jul. 18, 2013, the entire disclosure of which is incorporated by reference herein.

FIELD

The present teachings relate to apparatus and methods for mixing a reformable fuel and an oxygen-containing gas and/or steam for introduction to a reformer and/or a fuel cell stack of a fuel cell unit.

BACKGROUND

The conversion of a gaseous reformable fuel and/or a liquid reformable fuel to a hydrogen-rich carbon monoxide-containing gas mixture, a product commonly referred to as "synthesis gas" or "syngas," can be carried out in accordance with any of such well known fuel reforming operations such as steam reforming, dry reforming, autothermal reforming, and catalytic partial oxidation reforming.

The development of improved fuel reformers, fuel reformer components, and reforming processes continues to be the focus of considerable research due to the potential of fuel cell systems or simply, "fuel cells," i.e., devices for the electrochemical conversion of electrochemically oxidizable fuels such as hydrogen, mixtures of hydrogen and carbon monoxide, for example, syngas, and the like, to electricity, to play a greatly expanded role for general applications including main power units (MPUs) and auxiliary power units (APUs). Fuel cells also can be used for specialized applications, for example, as on-board electrical generating devices for electric vehicles, backup and primary power sources for residential-use devices, main power sources for leisure-use, outdoor and other power-consuming devices in out-of-grid locations, and lighter weight, higher power density, ambient temperature-independent replacements for portable battery packs.

Because large scale, economic production of hydrogen, infrastructure required for its distribution, and practical means for its storage (especially as a transportation fuel) are widely believed to be a long way off, much current research and development has been directed to improving both fuel reformers as sources of electrochemically oxidizable fuels, notably mixtures of hydrogen and carbon monoxide, and fuel cell assemblies, commonly referred to as fuel cell "stacks," as convertors of such fuels to electricity, and the integration of fuel reformers and fuel cells into more compact, reliable and efficient devices for the production of electrical energy.

With these considerations in mind, the efficient delivery of a mixture of a reformable fuel and an oxygen-containing gas and/or steam to a fuel reformer and/or a fuel cell stack is another area where development is needed. For example, a reformable fuel is usually mixed with air using a static mixer, where the reformable fuel typically is added to the air stream just prior to the static mixer and the resulting mixed reformable fuel and air stream delivered to a fuel reformer. However, such mixers typically cannot adequately mix the constituents before delivery to the reformer for example, due to the pressure drop. An injector nozzle system also can be used to mix a reformable fuel and air; however these systems do not typically provide a continuous fluid flow which can be measured accurately.

In addition, although gaseous reformable fuels can be pressurized and mixed with air somewhat efficiently, the vaporization of liquid reformable fuel followed by mixing with air is more challenging. The mixing should provide a fairly uniform composition, i.e., a homogenous mixture, of the reformable fuel and air to the reformer so that the temperature of reaction can be monitored and controlled appropriately and the flow rates of the air stream and reformable fuel addition adjusted to maintain an efficient reforming process while minimizing coking, which can be deleterious to reforming catalysts as well as fuel cell stacks. Thus, there is a need to improve apparatus for and methods of delivery of a mixed stream of a reformable fuel and an oxygen-containing gas to a reformer of a fuel cell unit.

SUMMARY

In light of the foregoing, the present teachings provide apparatus and methods for mixing a reformable fuel with an oxygen-containing gas and/or steam to provide a gaseous reforming reaction mixture suitable for reforming with a reformer and/or a fuel cell stack of a fuel cell unit. Homogeneous gas and air mixing is even more important for "on-cell" reforming whereby the reforming catalyst is incorporated into the fuel electrodes of a fuel cell stack. The apparatus and methods of the present teachings can provide a substantially uniformly mixed or homogeneous gaseous reforming reaction mixture for more efficient operation of a fuel cell unit. A homogeneous gaseous reforming reaction mixture of a desired oxygen to fuel ratio can increase the monitoring and control of the operation of a fuel cell unit using feedback loops. In addition, the fluid mixing devices and methods of the present teaching can provide fluid mixing, with low back pressure through the device enabling the use of commercially-feasible and economical components such as blowers to operate the device.

Moreover, the apparatus and methods of the present teachings can mix a gaseous reformable fuel, a vaporized liquid reformable fuel, or a liquid reformable fuel with an oxygen-containing gas prior to introduction to a reformer. The design of the device can effect efficient and effective mixing of a reformable fuel and an oxygen-containing gas, in part, due to the turbulent fluid flow paths through the device. Mixing of a liquid reformable fuel with an oxygen-containing gas also can be effected by the devices and methods of the present teachings due to the increase in volume and surface area upon the liquid reformable fuel entering the oxygen-containing gas stream through the fuel inlets of the device. The design of the device can permit a liquid reformable fuel, for example, a heated liquid reformable fuel, to be atomized and/or vaporized and mixed with a heated oxygen-containing gas stream to provide a gaseous reforming reaction mixture suitable for introduction to a reformer and/or a fuel cell stack of a fuel cell unit.

In addition, the fluid mixing devices and methods of the present teachings can permit the monitoring and control of the pressure and fluid flow characteristics of the fluid stream through the device for improved operation and efficiency. For examples the placement of pressure taps at strategic locations of the device can allow accurate measurements of fluid flow characteristics, including the delivery of the reformable fuel to the oxygen-containing gas stream.

Thus, in one aspect, the present teachings provide fluid mixing devices for mixing a reformable fuel and an oxygen-containing gas and/or steam where the resulting mixture or gaseous reforming reaction mixture can be delivered to a reformer and/or a fuel cell stack of a fuel cell unit or system.

For example, a fluid mixing device of the present teachings can include a tube having an inlet, an outlet, and a throat located between the inlet and the outlet, where the throat includes a smaller internal diameter than the internal diameter of the outlet, the longitudinal axis through the tube from the inlet to the outlet defines a downstream direction, at least a portion of the internal wall of the tube between the throat and the outlet comprises a helical mixing structure, and the tube includes one or more fuel inlets downstream from the throat. The internal diameter of the inlet can be larger than the internal diameter of the throat.

In another example, a fluid mixing device of the present teachings can include a tube having an inlet, an outlet, and a throat located between the inlet and the outlet, where the throat comprises a smaller internal diameter than the internal diameter of the outlet, the longitudinal axis from the inlet to the outlet defines a downstream direction, and the tube includes one or more fuel inlets downstream from the throat; and a collar encompassing the one or more fuel inlets on the exterior surface of the tube and creating with the tube a fuel injection chamber in fluid communication with the one or more fuel inlets, where the collar includes a fuel source inlet and isolates the one or more fuel inlets from the ambient environment exterior to the tube. The internal diameter of the inlet can be larger than the internal diameter of the throat. The fuel inlets can be defined by or include a porous barrier.

In another example, a fluid mixing device of the present teachings can include a tube having an inlet, an outlet, and a throat located between the inlet and the outlet, where the throat comprises a smaller internal diameter than the internal diameter of the outlet, the longitudinal axis from the inlet to the outlet defines a downstream direction, and the tube includes one or more fuel inlets downstream from the throat; and a fuel source tube concentric to the exterior surface of the tube at least upstream of the fuel inlets and continuing towards the outlet, where the fuel source tube is connected to or is integral with the tube at a location upstream from the one or more fuel inlets, and an interior surface of the fuel source tube and the corresponding exterior surface of the tube being spaced apart to define a fuel injection channel, the fuel injection channel being in fluid communication with the interior of the tube via the fuel inlets. The internal diameter of the inlet can be larger than the internal diameter of the throat. The fuel inlets can be defined by or include a porous barrier.

In another example, a fluid mixing device of the present teachings can include a tube having an inlet, an outlet, and a throat located between the inlet and the outlet, where the throat comprises a smaller internal diameter than the internal diameter of the outlet, the longitudinal axis through the tube from the inlet to the outlet defines a downstream direction, the tube includes one or more fuel inlets downstream from the throat, and the internal wall of the tube includes a step structure, the step structure being a depression or groove beginning upstream of the one or more fuel inlets and ending towards the outlet, and including one or more fuel inlets. The internal diameter of the inlet can be larger than the internal diameter of the throat.

In the various embodiments of fluid mixing devices of the present teachings, the tube can be, in whole or in part, made from a ceramic. For example, the tube downstream from the throat and/or including a portion of the throat can be a ceramic. A porous barrier can be a porous ceramic. In addition, the internal walls of the tube downstream from the throat can include a reforming catalyst.

In another aspect, the present teachings provide methods of mixing a reformable fuel and an oxygen-containing gas and/or steam, where the mixture is suitable for delivery to a reformer and/or to a fuel cell stack of a fuel cell unit or system. The methods can include operating a fluid mixing device of the present teachings.

For example, the methods of the present teachings can include delivering an oxygen-containing gas and/or steam through a tube comprising a throat such that the oxygen-containing gas and/or steam experiences an increase in velocity and decrease in pressure through the throat and a rifling or a twisting motion downstream of the throat along with an increase in pressure and decrease in velocity; and introducing a reformable fuel and/or steam into the stream of oxygen-containing gas and/or steam downstream of the throat, whereby the reformable fuel and/or steam mixes with the stream of the oxygen-containing gas and/or steam to provide a gaseous reforming reaction mixture.

In another example, the methods of the present teachings can include a method of operating a fluid mixing device of the present teachings, where the method can include delivering an oxygen-containing gas and/or steam to the inlet of and through the tube; and delivering a reformable fuel through the one or more fuel inlets, thereby to mix the oxygen-containing gas and/or steam and the reformable fuel.

In various embodiments of methods of the present teachings, the methods can include reforming or reforming partially the gaseous reforming reaction mixture prior to the gaseous reforming reaction mixture exiting an outlet of the tube. The methods also can include transferring heat generated by reforming or reforming partially the gaseous reforming reaction mixture to the reformable fuel and/or steam prior to introducing the reformable fuel and/or steam into the stream of oxygen-containing gas and/or steam. In addition, the methods can include introducing a reformable fuel and/or steam into the stream of oxygen-containing gas and/or steam comprises introducing a reformable fuel and/or steam through a porous barrier into the stream of oxygen-containing gas and/or steam.

The foregoing as well as other features and advantages of the present teachings will be more fully understood from the following figures, description, examples, and claims.

DESCRIPTION OF DRAWING

It should be understood that the drawings described below are for illustration purposes only. Like numerals generally refer to like parts. The drawings are not necessarily to scale, with emphasis generally being placed upon illustrating the principles of the present teachings. The drawings are not intended to limit the scope of the present teachings in any way.

DETAILED DESCRIPTION

Figure 1A:
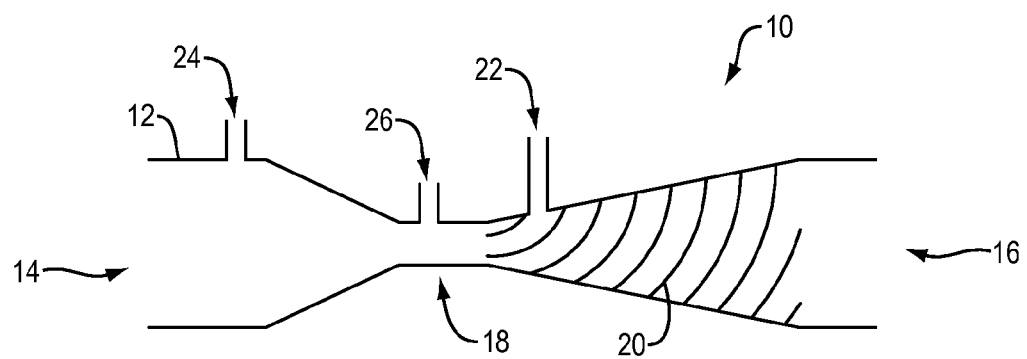
FIG. 1A is a schematic diagram of a cross-sectional view of an embodiment of a fluid mixing device of the present teachings having a single fuel inlet and helical mixing structure downstream from the throat portion of the device.

It now has been discovered that a reformable fuel can be efficiently mixed with an oxygen-containing gas and/or steam to provide a gaseous reforming reaction mixture that can be delivered to a reformer and/or a fuel cell stack of a fuel cell unit. That is, the present teachings provide fluid mixing devices and methods of mixing fluids such as a reformable fuel and an oxygen-containing gas such as air. The fluid mixing devices and methods, which can be described as Venturi-like tubes or using the Venturi effect, respectively, can include one or more of a helical mixing structure, a collar creating a fluid injection chamber associated with a plurality of fuel inlets of the tube, a fuel source tube concentric with a tube that can provide a counter-current heat transfer fuel injection channel, a reforming catalyst on an internal wall of the device in the mixing zone, and a step structure on an internal wall of a tube that can disrupt the linearity of the internal wall and can create localized turbulent flow.

For brevity, the discussion and description herein will mainly focus on partial oxidation reforming reactions and reactants including catalytic partial oxidation reforming reactions and reactants (a reformable fuel and an oxygen-containing gas). However, the devices, systems and methods described herein can equally apply to other reforming reactions such as steam reforming and autothermal reforming and their respective reactants (a reformable fuel and steam, and a reformable fuel, steam and an oxygen-containing gas, respectively). Accordingly, where an oxygen-containing gas is referenced herein in connection with a device or method, the present teachings should be considered as including steam in combination or alone, i.e., an oxygen-containing gas and/or steam, unless explicitly stated otherwise or understood by the context. In addition, where a reformable fuel is referenced herein in connection with a device or method, the present teachings should be considered as including steam in combination or alone, i.e., a reformable fuel and/or steam, unless explicitly stated otherwise or as understood by the context.

Throughout the application, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein. For example, where reference is made to a particular structure, that structure can be used in various embodiments of apparatus of the present teachings and/or in methods of the present teachings, unless otherwise understood from the context.

It should be understood that the expression "at least one of" includes individually each of the recited objects after the expression and the various combinations of two or more of the recited objects unless otherwise understood from the context and use.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

The use of the singular herein, for example, "a," "an," and "the," includes the plural (and vice versa) unless specifically stated otherwise.

Where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. Moreover, two or more steps or actions may be conducted simultaneously.

At various places in the present specification, values are disclosed in groups or in ranges. It is specifically intended that the description include each and every individual subcombination of the members of such groups and ranges and any combination of the various endpoints of such groups or ranges. For example, an integer in the range of 0 to 40 is specifically intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40, and an integer in the range of 1 to 20 is specifically intended to individually disclose 1, 2, 3, 4, 5, 6, 7, 8, 9, 10, 11, 12, 13, 14, 15, 16, 17, 18, 19, and 20.

The use of any and all examples, or exemplary language herein, for example, "such as," "including," or "for example," is intended merely to illustrate better the present teachings and does not pose a limitation on the scope of the invention unless claimed. No language in the specification should be construed as indicating any non-claimed element as essential to the practice of the present teachings.

Terms and expressions indicating spatial orientation or altitude such as "upper," "lower," "top," "bottom," "horizontal," "vertical," and the like, unless their contextual usage indicates otherwise, are to be understood herein as having no structural, functional or operational significance and as merely reflecting the arbitrarily chosen orientation of the various views of apparatus, devices, components, and/or features of the present teachings that may be illustrated in certain of the accompanying figures.

As used herein, "liquid reformable fuel" refers to and includes reformable carbon- and hydrogen-containing fuels that are a liquid at standard temperature and pressure (STP) conditions, for example, methanol, ethanol, naphtha, distillate, gasoline, kerosene, jet fuel, diesel, biodiesel, and the like, that when subjected to reforming undergo conversion to hydrogen-rich reformates. The expression "liquid reformable fuel" shall be further understood to include such fuels whether they are in the liquid state or in the gaseous state, i.e., a vapor.

As used herein, "gaseous reformable fuel" refers to and includes reformable carbon- and hydrogen-containing fuels that are a gas at STP conditions, for example, methane, ethane, propane, butane, isobutane, ethylene, propylene, butylene, isobutylene, dimethyl ether, their mixtures, such as natural gas and liquefied natural gas (LNG), which are mainly methane, and petroleum gas and liquefied petroleum gas (LPG), which are mainly propane or butane but include all mixtures made up primarily of propane and butane, and the like, that when subjected to reforming undergo conversion to hydrogen-rich reformates. A gaseous reformable fuel also includes ammonia, which like other gaseous reformable fuels, can be stored as a liquid.

As used herein, a "reformable fuel" refers to a liquid reformable fuel and/or a gaseous reformable fuel.

As used herein, "gaseous reforming reaction mixture" refers to a mixture including a gaseous liquid reformable fuel (e.g., a vaporized liquid reformable fuel), a gaseous reformable fuel, or combinations thereof, and an oxygen-containing gas, for example, air, and/or water, for example, in the form of steam. A gaseous reforming reaction mixture can be subjected to a reforming reaction to create a hydrogen-rich product ("reformate"), which also can contain carbon monoxide. Where a catalytic partial oxidation ("CPOX") reforming reaction is to be carried out, the gaseous reforming reaction mixture can be referred to as a "gaseous CPOX reaction mixture" which includes a reformable fuel and an oxygen-containing gas. Where a steam reforming reaction is to be carried out, the gaseous reforming reaction mixture can be referred to as a "gaseous steam reforming reaction mixture," which includes a reformable fuel and steam. Where an autothermal ("AT") reforming reaction is to be carried out, the gaseous reforming reaction mixture can be referred to as a "gaseous AT reforming reaction mixture," which includes a reformable fuel, an oxygen-containing gas and steam.

As used herein, a "fuel cell stack" refers to the component of a fuel cell unit or fuel cell system where the electrochemical reaction takes place to convert hydrogen or electrochemically-oxidizable species to electricity. The fuel cell stack includes an anode, a cathode, and an electrolyte, often formed in layers. In operation, hydrogen and any other electrochemically oxidizable component(s) of a reformate entering a fuel cell stack, for example, from a reformer and/or a fluid mixing device of the present teachings, combine with oxygen anions within an anode layer of the fuel cell stack to produce water and/or carbon dioxide and electrons. The electrons generated within the anode layer migrate through the external load and back to the cathode layer where oxygen combines with the electrons to provide oxygen anions which selectively pass through the electrolyte layer and the anode layer.

As used herein, "in operable fluid communication with" refers to fluid communication between or among various components and/or structure when the components and/or structure are in an operative or active state or position; however, fluid communication can be interrupted when the components and/or structure are in an inoperative or inactive state or position. Operable fluid communication can be controlled by a valve assembly positioned between or among components and/or structure. For example, if A is in operable fluid communication with B via a valve assembly, then fluid can flow or be delivered from A to B when the valve assembly is "open" thereby permitting fluid communication between A and B. However, fluid communication between A and B can be interrupted or ceased when the valve assembly is "closed." In other words, the valve assembly is operable to provide fluid communication between A and B. It should be understood that fluid communication can include various degrees and rates of fluid flow and related characteristics. For example, a fully-opened valve assembly can provide fluid communication between or among components and/or structure as can the valve assembly when it is partially-closed; however, the fluid flow characteristics such as flow rate can be affected by the different positions of the valve assembly. As used herein, "in operable fluid communication with" and "in fluid communication with" can be used interchangeably unless the context dictates otherwise.

As used herein, to "control the flow," "control the delivery," "adjust the flow," and "adjust the delivery" of a fluid, including grammatical equivalents and equivalent expressions and language, can be to increase the flow or delivery of fluid, to decrease the flow or delivery of fluid, to maintain a substantially constant flow or delivery of fluid, and/or to interrupt or cease the flow or delivery of fluid.

Similarly, to "control the pressure" and "adjust the pressure," including grammatical equivalents and equivalent expressions and language, can be to increase the pressure, to decrease the pressure, to maintain a substantially constant pressure, and/or to interrupt or cease the pressure. It should be understood that in many circumstances, to "control the flow" and "adjust the flow" can be to "control the pressure" and "adjust the pressure," and vice versa. In addition, "controlling," "adjusting," and "manipulating" a component of a delivery system, a fuel cell unit, or a fuel cell system (including grammatical equivalents and equivalent expressions and language), for example, a valve assembly or a source of positive gaseous pressure, can effect the same changes and/or steady-state operation as described above.

As used herein, a "valve assembly" refers to a structure or structures together that can monitor and/or control fluid communication and fluid flow characteristics between or among components and/or structure, for example, the delivery of propane from a source of propane to a reformer. A valve assembly can be a single valve or include a plurality of valves and related structure, where certain structures can be in series. A valve assembly can be or include a pressure metering assembly. For example, a valve assembly can be or include a metering valve thereby permitting digital control of the flow and delivery of fluids. A valve assembly can be or include valves in a piccolo arrangement, for example, a series of orifices, each associated with a proportional valve. A valve assembly can include a proportional valve such as a proportional solenoid valve; or a series of proportional valves such as a series of proportional solenoid valves. A valve assembly can include an on/off valve such as a solenoid valve; or a series of on/off valves, for example, a series of on/off solenoid valves. A valve assembly can include a three-way valve; a series of three-way valves; a check valve; a series of check valves; an orifice; a series of orifices; and combinations thereof and of the other valves and valve assemblies described herein, where certain of the valves and valve assemblies can be in series. Where structures or components are indicated as being in series, the components can be either in a parallel series or in a sequential series (e.g., collinear).

As used herein, a "sensor assembly" refers to any suitable sensor or sensing device or combination of sensor or sensing devices for the operating parameter(s) being monitored, measured and/or determined. For example, fuel flow rates can be monitored with any suitable flow meter, pressures can be monitored with any suitable pressure-sensing or pressure-regulating device, and temperatures can be monitored with any suitable temperature sensor. Accordingly, examples of sensor devices include flow meters, pressure meters, thermocouples, thermistors, and resistance temperature detectors. A sensor assembly can be a fluid flow differential pressure sensor or gauge, or simply, a differential pressure measurement assembly. A differential pressure measurement assembly typically includes two pressure taps. A differential pressure measurement assembly can include or be associated with a valve assembly such an orifice or a proportional valve (assembly) such that the pressure of the fluid before entering the valve or valve assembly is measured and the pressure after the fluid exits the valve or valve assembly is measured and the difference determined. A sensor or sensing device can include a balance, a weighing scale such as a spring scale, or other device for measuring, determining and/or monitoring the weight of an object. The sensor assemblies optionally can include a transducer in communication with the controller.

As used herein, a "source of positive gaseous pressure" or a "source of positive gas pressure" refers to device or apparatus that can produce a positive gaseous or gas pressure or cause gas movement. A source of positive gas pressure can be a positive displacement blower, pump or compressor, or a dynamic blower, pump or compressor. Examples of sources of positive gaseous or gas pressure include a fan, a plurality or series of fans, a rotary pump, such as a rotary vane pump, a plurality or a series of rotary pumps, a blower, for example, a centrifugal blower, a plurality or series of blowers, for example, a plurality or series of centrifugal blowers, an air pump, a container of compressed gas such as a tank of air or an inert gas, and combinations thereof. A "positive gaseous pressure" or a "positive gas pressure" can be realized from any of these sources of positive gas pressure and others known to those skilled in the art. A "source of oxygen-containing gas" can be a source of positive gas pressure and/or can be delivered by a source of positive gas pressure, for example, a fluid stream from one or more components of a fuel cell unit and/or system.

A fuel cell system including a fluid mixing device of the present teachings can include various conduits. A fluid mixing device and its peripheral components can include a plurality of conduits, for example, two or more conduits, positioned to provide operable fluid communication between or among components of the fluid mixing device, a source of reformable fuel, a source of oxygen-containing gas, a fuel cell system, and its components. For example, a plurality of conduits can couple a fluid mixing device to components of a fuel cell unit and/or system as well as couple the fuel cell system components themselves. That is, the components of the fluid mixing device and methods of the present teachings including peripheral components and devices can include conduits connecting or linking the components, for example, a source of liquid reformable fuel, a source of gaseous reformable fuel, a source of positive gas pressure, a reformer, a vaporizer, a source of oxygen-containing gas, valve assemblies, sensor assemblies, and related equipment such as liquid pumps. Each of these components and others can include one or more of an inlet, an outlet, and a port to permit fluid communication, for example, operable fluid communication, to be established between or among the components. It also should be understood that the conduits can include other components and devices associated therewith, for example, valve assemblies, pumps, sources of positive gaseous pressure, and sensor assemblies.

The conduits or conduit system can have many specific designs, configurations, arrangements, and connections depending on many factors, for example, the particular application, the reformable fuel, and the footprint size of the overall delivery system and/or fuel cell system. Thus, the conduit systems described and/or shown herein are merely for illustrative purposes and are not meant to limit the present teachings in any way. Moreover, where two or more conduits may be described as connected to, coupled to, or otherwise joining a component or components, for example, a valve assembly and a source of gaseous reformable fuel, a single conduit also can be envisioned as achieving the same design and/or purpose, where the component such as a valve assembly can be described as being "in-line with," "situated within," or "associated with" a single conduit. In addition, "coupled to," "connected to" or otherwise joining two or more components or structure can mean that the one component or structure is directly or indirectly coupled, connected or joined to another component or structure.

A conduit can be a duct, for example, a channel, tube or passageway for conveying a fluid. For example, a source of positive gaseous pressure conduit can be used to carry or deliver a gas, for example, air, to an inlet of a fluid mixing device and/or to deliver a reformable fuel to a fuel inlet of a fluid mixing device. A conduit can be a manifold, for example, a chamber, pipe or duct with a number of inlets or outlets used to collect or distribute a fluid. As used herein, a "common conduit" generally refers to a multi-ported conduit for fluid delivery to and/or from specific locations.

A fuel cell unit and or fuel cell system can include a control system for automating the operations of the unit and/or system associated with a fluid mixing device and/or a fuel cell. The control system can include a plurality of sensors in communication with a controller. In response to input signals from the sensors, user commands from a user-input device and/or programmed subroutines and command sequences, a controller can manage the operations of a fluid mixing device, for example, the flow characteristics of an oxygen-containing gas and a reformable fuel to the fluid mixing device, and/or a fuel cell system.

A fluid mixing device, a fuel cell unit and a fuel cell system of the present teachings can include a control system for independently automating the operations of the device, the individual fuel cell units, components thereof, and/or the fuel cell system including components thereof, for example, in its start-up, steady-state, and/or shut-down modes. A control system can include control components, for example, control electronics, actuators, valve assemblies, sensor assemblies, and other structure and devices to monitor, control and/or adjust independently the operation of a fluid mixing device, for example, the flow characteristics of an oxygen-containing gas and a reformable fuel to the fluid mixing device, individual components thereof such as a valve assembly, a source of positive gas pressure, a source of gaseous reformable fuel, a source of liquid reformable fuel, a heater, an individual fuel cell unit, one or more components thereof, and/or a fuel cell system.

A control system can include a controller, which can be in communication with the various control components and components of a fluid mixing device and/or each fuel cell unit. The control system and/or controller can monitor and logically control the flow path of fluids through a fluid mixing device, through individual fuel cell units, and through a fuel cell system. In other words, a custom fluid circuit can be achieved through a fluid mixing device, in a fuel cell unit and/or in a fuel cell system using a control system.

The control system can include a one or more sensors or sensor assemblies in communication with a controller. In response to input signals from the sensors, user commands from a user-input device and/or programmed subroutines and command sequences, a controller can manage independently the operations of a fluid mixing device and/or one or more fuel cell units. The controller can be software operating on a processor. However, it is within the scope of the present teachings to employ a controller that is implemented with one or more digital or analog circuits, or combinations thereof. In response to input signals from the sensors, user commands from a user-input device and/or programmed subroutines and command sequences, a controller can manage the operations of a fluid mixing device, and/or of one or more fuel cell units, and/or of a fuel cell system.

The sensor assemblies can, but do not necessarily, include a transducer in communication with the controller. The communication pathways will ordinarily be wired electrical signals but any other suitable form of communication pathway can also be employed. That is, the sensor assemblies, control signal-receiving devices, and communication pathways herein can be of any suitable construction such as those known in the art.

In one aspect, the present teachings provide fluid mixing devices for mixing a reformable fuel and an oxygen-containing gas such as air for delivery to a reformer of a fuel cell system. The fluid mixing device generally includes a tube having an inlet, an outlet, and a throat located between the inlet and the outlet. The throat includes a smaller internal diameter than the internal diameter of the outlet. The throat can include a smaller internal diameter than the inlet of the tube. The longitudinal axis of the tube from the inlet to the outlet defines a downstream direction. At least a portion of the internal wall of the tube between the throat and the outlet can include a helical mixing structure. The helical mixing structure can be or include at least one of a groove or a depression in the wall of the tube and a fin or other structure protruding from the wall of the tube, for example, an extruded triangular-shaped blade. The helical mixing structure can create or define one or more rifling channels. Where a plurality of rifling channels are present, the rifling channels can be independent rifling channels, for example, such that the internal walls in each independent rifling channel would not be accessible to another independent rifling channel without passing or crossing over the helical mixing structure. The tube also includes one or more (reformable) fuel inlets downstream from the throat.

A throat can be defined by or is a narrowed or constricted section of the tube. The throat can have a smaller internal diameter than the inlet of the tube. The throat typically has a smaller internal diameter than the outlet of the tube. A throat can have a length along the longitudinal axis through the tube, where the length can depend on various parameters such as the internal diameter of the throat, the internal diameter of the inlet, the angle (or taper) and length of a decrease in the internal diameter of the tube from the inlet to the throat, the internal diameter of the outlet of the tube, and the angle (or degree of widening) and length of increase in the internal diameter of the tube from the throat to the outlet. A throat can have a length that is defined by a plane perpendicular to the longitudinal axis through the tube. That is, the internal diameter of the wall from the inlet can decrease towards the throat and the internal diameter of the wall from the throat increase towards the outlet, where the increase in internal diameter begins after the decrease in internal diameter towards the throat ceases.

The internal diameter of the tube upstream from the throat, i.e., from the inlet of the tube to the throat, can be of a larger diameter than the throat. The internal diameter of the inlet of the tube to the throat can be constant or substantially constant for any part of its length. The internal diameter of the portion of the tube from the inlet to the throat can taper or decrease in internal diameter in the downstream direction to the throat. The decrease in internal diameter can be a linear decrease, an exponential decrease, or combinations of one or both thereof including a constant diameter section. For example, an internal diameter of the tube from the inlet can be substantially constant for a length, decrease exponentially for a length, decrease linearly at a first angle in relation to the longitudinal axis through the tube for a length, and decrease linearly at a second angle to the throat for a length. Likewise, but in the opposite sense, the internal diameter of the tube downstream from the throat can have a larger diameter and widen along the longitudinal axis in the same way as the internal diameter of the tube can taper or decrease upstream of the throat.

In various embodiments, at least a portion of the internal wall of the tube between the inlet and the throat includes a helical mixing structure. The helical mixing structure between the inlet and the throat can be in the same direction of rotation as a helical mixing structure between the throat and the outlet. The helical mixing structure between the inlet and the throat can be in the opposite direction of rotation as a helical mixing structure between the throat and the outlet. In certain embodiments, a helical mixing structure can be present on the internal wall of the tube along the entire length through the throat. For example, the helical structure can be continuous from the inlet to the outlet such that the channels created by the helical mixing structure are continuous and propagate through the throat. In particular embodiments, a helical structure can be present and on the internal wall of the throat as well as upstream and downstream thereof (but not along the entire length of the internal wall from the inlet to the outlet of the tube).

In addition, the degree of the twist of a helical structure can be constant throughout its length or can vary. For example, the distance between each twist of a helical mixing structure can increase and/or decrease along the downstream direction of the tube, as well as combinations thereof. In certain embodiments, a straight channel or channels can be present on the internal wall of the tube near the inlet of the fluid mixing device, which straight channels can begin to form a helical mixing structure. The helical mixing structure in these embodiments and in other embodiments including a helical mixing structure can have an increasing twist (i.e., shorter distance between successive helical twists) towards the throat. The increasing twist can continue through the throat, if a helical mixing structure is present, and downstream from the throat, for example, to the outlet of the tube.

In various embodiments, the internal wall of a tube can include a plurality of dimples, e.g., such as the dimples on a golf ball. Such a design can reduce the pressure drop associated with the device, for example, by effecting and reducing or breaking up the boundary layer along the internal wall. Such dimples can be distinguished from a step structure as described herein, because a step structure can create localized mixing of fluids, for example, a localized vortex or eddy of the flowing fluids.

In some embodiments, the one or more fuel inlets include a series of holes around the circumference of the tube, where the series of holes provide fluid communication between the interior of the tube and the exterior of the tube. The series of holes can be perpendicular to or substantially perpendicular to the longitudinal axis of the tube. The series of holes can be in a helical pattern around the circumference of the tube, where the helical pattern can have the same or opposite direction of rotation as the helical mixing structure between the throat and the outlet. The fuel inlets or series of holes can be in various patterns, partially or fully encircling the tube. For example, two or more series of holes can be adjacent each other around the circumference of the tube or around the semi-circle of the tube.

In various embodiments, particularly where a collar and/or a fuel source tube is present in the design of the device, a porous barrier can define the fuel inlets. That is, a porous barrier can form a portion of the wall of the tube, for example, at the outlet of the throat and/or a portion of the tube downstream from the throat, where the fuel inlets typically are located. A porous barrier can be a diffusion barrier. A porous barrier can be a porous membrane, a porous polymer, and/or a porous ceramic, or other porous material that can create a diffusion barrier for reformable fuels and/or steam and remain stable under the operating conditions experienced by a fluid mixing device. If the porous barrier is located in a fluid-tight zone (but for the porous barrier), for example, along or as a face or a surface of a fuel injection chamber or a fuel injection channel, a reformable fuel can diffuse or otherwise pass through the porous barrier into the interior of the tube. Because a fuel injection chamber and channel can be fluid-tight for the pressurized delivery of a reformable fuel through the fuel inlets (here, a porous barrier) and the pressure opposite the fuel injection chamber and channel at the location of the fuel inlets can be relatively low, the higher pressure on the reformable fuel cell side can move the reformable fuel through the porous barrier into the high velocity oxygen-containing gas stream moving through the tube. Such a design and operation can be advantageous for liquid reformable fuels, where heat transfer from the device can heat the liquid reformable fuel before it enters the tube.

The use of a porous barrier can permit a pressure tap for a differential pressure measurement assembly to be located on the throat of the tube without interrupting or minimizing the interruption of the pressure measurement in the throat because a reformable fuel diffuses into the stream of oxygen-containing gas from a porous barrier rather than being "sprayed" into the stream as with fuel inlets that are holes. Although a porous barrier can be located along the entire or substantially entire surface or wall of the tube defined by a fuel injection chamber (or a partial surface or wall of a fuel injection channel), a porous barrier can be a narrower band or section (in the direction of the longitudinal axis) of the tube. Despite having a smaller surface area from which to diffuse or move reformable fuel into the stream of oxygen-containing gas, the porous barrier can be of a higher porosity than would be used for a larger surface area porous barrier thereby allowing the same amount or volume of the reformable fuel to be diffused or moved into the stream of oxygen-containing gas while minimizing back pressure issues.

In particular embodiments, the fluid mixing device includes a second tube, where the second tube includes an inlet and an outlet, and the outlet of the second tube is in fluid communication with the interior of the tube via a fuel inlet. The second tube can include a throat located between the inlet and the outlet of the second tube, where the throat of the second tube comprises a smaller diameter than the diameter of the outlet and the inlet of the second tube. For example, the tube and the second tube can be Venturi-shaped tubes and have respective pressure taps for measuring the flow rate of the fluids flowing therethrough. In certain embodiments, the second tube can include a throat, where the throat of the second tube includes a smaller diameter than the diameter of the inlet of the second tube, and the outlet of the second tube comprises the throat of the second tube, i.e., the throat of the second tube intersects the tube.

In various embodiments, including those without a helical mixing structure on or in an internal wall of a tube, a fluid mixing device includes a collar encompassing one or more fuel inlets on an exterior surface of the tube, which collar creates with the tube a fuel injection chamber that is in fluid communication with, for example, operable fluid communication with, the one or more fuel inlets. The collar can include a fuel source inlet. The collar can isolate the one or more fuel inlets from the ambient environment exterior to the tube. The fuel inlets can be a porous barrier.

In some embodiments, the fluid mixing device includes a fuel source tube concentric to the exterior surface of the tube at least upstream of the fluid inlets and continuing towards the outlet. The fuel source tube can be connected to or can be integral with the tube at a location upstream from the one or more fuel inlets. The fuel source tube can be connected to or can be integral with a collar as described herein. The interior surface of the fuel source tube and the corresponding exterior surface of the tube are spaced apart to define a fuel injection channel, where the fuel injection channel is in fluid communication with the interior of the tube via the fuel inlets. The fuel inlets can be a porous barrier. The fuel injection channel can include an inlet. The inlet of the fuel injection channel can be in fluid communication, for example, operable fluid communication, with a source of reformable fuel.

In various embodiments, a fluid mixing device for mixing reformable fuel and an oxygen-containing gas generally includes a tube having an inlet, an outlet, and a throat located between the inlet and the outlet, where the throat can have a smaller internal diameter than the internal diameter of the outlet, the longitudinal axis from the inlet to the outlet defines a downstream direction, and the tube includes one or more fuel inlets downstream from the throat; and a collar encompassing the one or more fuel inlets on the exterior surface of the tube and creating with the tube a fuel injection chamber in fluid communication with the one or more fuel inlets, where the collar includes a fuel source inlet and isolates the one or more fuel inlets from the ambient environment exterior to the tube. The internal diameter of the inlet can be larger than the internal diameter of the throat.

In some embodiments, a fluid mixing device generally includes a tube having an inlet, an outlet, and a throat located between the inlet and the outlet, where the throat includes a smaller internal diameter than the internal diameter of the outlet, the longitudinal axis from the inlet to the outlet defines a downstream direction, and the tube includes one or more fuel inlets downstream from the throat; and a fuel source tube concentric to the exterior surface of the tube at least upstream of the fluid inlets and continuing towards the outlet, where the fuel source tube can be connected to or can be integral with the tube at a location upstream from the one or more fuel inlets, and an interior surface of the fuel source tube and the corresponding exterior surface of the tube are spaced apart to define a fuel injection channel, where the fuel injection channel is in fluid communication with the interior of the tube via the fuel inlets, and in the thermal communication with the interior of the tube corresponding to the fuel injection channel. The internal diameter of the inlet can be larger than the internal diameter of the throat.

In various embodiments of the fluid mixing devices, the internal diameter of the tube generally increases linearly or substantially linearly in the downstream direction from the throat. The internal diameter of the tube can increase linearly or substantially linearly in the downstream direction from the throat at an angle of about 12°, about 10°, about 8°, about 6° or less as measured along the longitudinal axis through the tube. In some embodiments of the fluid mixing devices, the internal diameter of the tube can generally decrease linearly or substantially linearly in the downstream direction from the inlet to the throat. The throat as well as sections or portions of the non-throat sections or portions of the tube can have a constant internal diameter. The non-throat sections or portions of the tube can include a combination of constant internal diameter and increases or decreases in the internal diameter.

In some embodiments, the portion of the tube downstream from the throat can be made of a ceramic. Indeed, the entire tube of a fluid mixing device can be made of ceramic. However, in particular embodiments, where at least a portion of the tube from the outlet or near the outlet towards the throat is a ceramic, at least a portion of the internal wall of the ceramic tube section can be coated and/or impregnated with a reforming catalyst. In such embodiments, the reforming reaction can be initiated in the fluid mix device prior to entry into a reformer and/or a fuel cell stack. Consequently, the heat generated by the reforming reaction in the fluid mixing device can be a heat source for heating and/or vaporizing reformable fuel such as a liquid reformable fuel and/or water (steam), for example, entering the device through a fuel injection channel. In particular embodiments, about 10%, about 20%, about 30%, about 40%, about 50%, about 60% or more of the length of the internal wall of the tube from the outlet to the throat can include a reforming catalyst.

In certain embodiments of fluid mixing devices, the internal wall of the tube includes a step structure, where the step structure is a depression or groove beginning upstream of the one or more fuel inlets and ending towards the outlet, and the step structure includes one or more fuel inlets. A step structure typically is shaped to disrupt the flow of fluid along the internal wall of the tube and can include an edge. For example, the upstream end of the step structure can include a depression or groove that is perpendicular or substantially perpendicular to the longitudinal axis of the tube. The longitudinal cross-sectional shape of a step structure can be triangular or substantially triangular when considered along the linear axis of the internal wall of the tube. The longitudinal cross-sectional shape of a step structure can be radiused-shaped when considered along the linear axis of the internal wall of the tube. A step structure can be a combination of sharp or angled corners or edges and radiused or rounded corners.

A fluid mixing device of the present teachings can include a sensor assembly, for example, one or more sensor assemblies such as a first pressure tap and a second pressure tap and/or a differential pressure measurement assembly, for example, associated with two pressure taps. Such a differential pressure measurement assembly can include or be associated with a tube or with a valve assembly such an orifice or a proportional valve (assembly) such that the pressure of a fluid before entering a throat of the tube or a valve assembly can be measured and the pressure of the fluid in the throat or after exiting the throat or the valve assembly can be measured and the difference determined. Knowledge of the pressure of a fluid stream can permit calculation of the flow rate of the fluid. A sensor assembly can be located upstream from the one or more fuel inlets, upstream from the throat of the tube and/or the second tube, associated with such as on the throat of the tube and/or the second tube, downstream from the throat of the tube and/or the second tube, downstream from the one or more fuel inlets, and combinations thereof. Each of the first pressure tap and the second pressure tap can be located upstream from the one or more fuel inlets. The pressure taps or a differential pressure measurement assembly can be located or positioned at the largest effective internal diameter of the tube and at the smallest effective diameter of the tube such as in the throat.

Another aspect of the present teachings provides a fuel cell system generally including a fluid mixing device of the present teachings; and a reformer and/or fuel cell stack, where the reformer and/or the fuel cell stack can be in fluid communication, for example, operable fluid communication, with the outlet of the tube. The reformer can be in fluid communication, for example, operable fluid communication, with a fuel cell stack. The fuel cell system can include a vaporizer in fluid communication, for example, operable fluid communication, with a fluid mixing device of the present teachings and/or a reformer. The fuel cell system can include an afterburner, where the afterburner is in fluid communication, for example, operable fluid communication, with the fuel cell stack. The fuel cell system can include a source of oxygen-containing gas in fluid communication, for example, operable fluid communication, with the inlet of the tube. The fuel cell system can include a source of reformable fuel in fluid communication, for example, operable fluid communication, with the one or more fuel inlets. The fuel cell system can include a source of positive gaseous pressure to deliver reformable fuel, for example, gaseous reformable fuel, vaporized liquid reformable fuel and/or liquid reformable fuel, to the one or more fuel inlets. The fuel cell system can include a liquid pump for delivering liquid reformable fuel to a vaporizer and/or to the one or more fuel inlets.

A fluid mixing device of the present teachings can be made of a thermally conductive material. As such, heat transfer to and/or from the fluid mixing device can assist in the thermal management of the fuel cell system. For example, a fluid mixing device can be located in the fuel cell stack and/or the afterburner exhaust to aid in the vaporization and/or heating of a reformable fuel. In addition, where the fluid mixing device includes a reforming catalyst in its downstream portion, the heat generated by the reforming reaction can aid in the vaporization and/or heating of a reformable fuel, especially where the design includes a fuel source tube and fuel injection channel. The fluid mixing device can be formed in or placed in a chamber enclosing a fuel cell unit (e.g., a reformer, a fuel cell stack, and an afterburner, and optionally, a vaporizer), where the convective heat transfer in the chamber and through the components therein can facilitate the thermal management of the fuel cell unit and its components. Such a design can create an integrated package for efficient liquid reformable fuel reforming.

In another aspect, the present teachings provide methods of operating a fluid mixing device of the present teachings. Such methods generally include delivering an oxygen-containing gas and/or steam to the inlet of and through the tube of a fluid mixing device of the present teachings; and delivering a reformable fuel and/or steam through the one or more fuel inlets, thereby to mix the oxygen-containing gas and/or steam and the reformable fuel and/or stream. The reformable fuel can be a liquid reformable fuel, a vaporized liquid reformable fuel, a gaseous reformable fuel, and combinations thereof.

In various embodiments, the methods of the present teachings include delivering a mixture of the oxygen-containing gas and/or steam and the reformable fuel and/or steam from the outlet of the tube. The methods can include delivering to a reformer and/or a fuel cell stack a mixture of an oxygen-containing gas and/or steam and a reformable fuel and/or steam such as a gaseous reforming reaction mixture. The oxygen-containing gas can include at least one of air and an anode exhaust stream from the fuel cell stack.

In some embodiments, independent of certain specific structure recited herein, the methods of the present teachings include delivering an oxygen-containing gas and/or steam through a tube comprising a throat such that the oxygen-containing gas and/or steam experiences an increase in velocity and decrease in pressure through the throat and a rifling or twisting motion downstream of the throat along with an increase in pressure and decrease in velocity; and introducing a reformable fuel and/or steam into the stream of oxygen-containing gas and/or steam downstream of the throat, whereby the reformable fuel and/or steam mixes with the stream of the oxygen-containing gas and/or steam to provide a gaseous reforming reaction mixture.

In certain embodiments, the oxygen-containing gas and/or steam can experience a rifling or twisting motion prior to passing through the throat, i.e., upstream of the throat. In particular embodiments, the oxygen-containing gas and/or steam experience a rifling or a twisting motion upstream of, through, and downstream of the throat. As an example, a rifling or twisting motion of a fluid or stream of fluid(s) can be realized when the fluid(s) are passed through a tube including a helical mixing structure.

In various embodiments of the methods of the present teachings, introducing the reformable fuel and/or steam into the stream of oxygen-containing gas can include introducing the reformable fuel and/or steam through a plurality or a series of fuel inlets around the circumference of the tube. Where the fuel inlets are defined by a porous barrier, methods of the present teachings can include introducing a reformable fuel and/or steam into the stream of oxygen-containing gas through the porous barrier.

Introducing a reformable fuel and/or steam into the stream of oxygen-containing gas and/or steam can include introducing the reformable fuel and/or steam at or as close to the point of highest velocity of the stream of oxygen-containing gas and/or steam without effecting or minimizing the effect on the differential pressure measurement along the tube. In some embodiments, introducing a reformable fuel and/or steam into the stream of oxygen-containing gas and/or steam can include introducing the reformable fuel and/or steam near to the outlet of the throat, such as within about 1%, about 2%, about 3%, about 5%, about 7%, about 10%, about 12%, about 15%, about 17%, about 20%, or about 25% of the length along the longitudinal axis through the tube from the outlet of the throat to the outlet of the tube.

In certain embodiments, introducing a reformable fuel and/or steam into the stream of oxygen-containing gas and/or steam can include introducing the reformable fuel and/or steam at or directly downstream of (the flat face of) the outlet of the throat. In such cases and where a helical mixing structure is present providing independent rifling channels propagating through the length of the tube, the fuel inlets, for example, holes in the tube wall, can be located in independent rifling channels that do not have a pressure tap associated therewith. That is, a pressure tap can be located in the throat region (e.g., close to the flat face of the outlet of the throat) and coincide with a channel running therethrough that is not associated with a fuel inlet. Another pressure tap for a differential pressure measurement can be located upstream of the throat in a wider diameter section of the tube in the same channel as the pressure tap in the throat region. The height of the helical mixing structure can influence the effect of such a design on the differential pressure measurement and how close the pressure tap and the fuel inlets can be to the flat face of the outlet of the throat.

The methods can include transferring heat to the reformable fuel from the oxygen-containing gas prior to introducing the reformable fuel into the stream of oxygen-containing gas, for example, where the reformable fuel flows counter to the downstream direction of the tube and is in thermal communication with the oxygen-containing gas. The methods of the present teachings can include introducing a mixture of a reformable fuel and an oxygen-containing gas such as a gaseous reforming reaction mixture to a reformer of a fuel cell unit or fuel cell system.

The following exemplary embodiments are provided to illustrate further and to facilitate the understanding of the present teachings and are not in any way intended to limit the invention.

Again, as stated previously for brevity, the discussion and description herein will focus on partial oxidation reforming reactions and reactants including catalytic partial oxidation reforming reactions and reactants (a reformable fuel and an oxygen-containing gas). However, the devices, systems and methods described herein can equally apply to other reforming reactions such as steam reforming and autothermal reforming and their respective reactants. For example, for steam reforming steam can replace an oxygen-containing gas in the description herein. For autothermal reforming, steam can be introduced along with an oxygen-containing gas and/or a reformable fuel in the description herein.

In addition, the similar components of figures can be the same or different, for example, having various modifications associated therewith such as materials of construction, sensor assemblies, valve configurations, conduit connections and arrangement, and the like.

FIG. 1A is a schematic diagram of a cross-sectional view of an embodiment of a fluid mixing device of the present teachings having a single fuel inlet and helical mixing structure downstream from the throat portion of the device.

Referring to FIG. 1A, the fluid mixing device 10 includes a tube 12 having an inlet 14 and an outlet 16. The fluid mixing device 10 has a throat 18 located between the inlet 14 and the outlet 16. The fluid mixing device includes a helical mixing structure 20 and a fuel inlet 22. The depicted fluid mixing device also includes a first pressure tap 24 and a second pressure tap 26.

In operation of the depicted device, an oxygen-containing gas such as air can be introduced into the tube through its inlet and passed through the tube, for example, with the use of a source of positive gas pressure. As the oxygen-containing gas passes through the tube, the velocity of the gas stream increases and its pressure decreases as it passes through the tapered section of the tube upstream of the throat, i.e., where the internal diameter of the tube decreases to that of the throat. When the oxygen-containing gas passes through the throat, the velocity of the gas stream reaches its highest value and its pressure the lowest. Subsequently, as the gas stream passes out of the throat and enters the widening section of the tube downstream from the throat, i.e., where the internal diameter of the tube increases towards the outlet, the gas stream experiences turbulence created by the geometry of the structure, which can be a location for efficient and effective mixing of fluids. As the fluid stream passes towards the outlet, the velocity of the fluid stream decreases and the pressure recovers. Consequently, the overall pressure flow loss through the device can be minimized.

Moreover, the helical mixing structure present downstream from the throat adds a rifling or twisting effect to the gas stream furthering its turbulence. A reformable fuel can be introduced into the interior of the tube and into the oxygen-containing gas stream downstream from the throat through the fuel inlet, where the reformable fuel can mix with the stream of oxygen-containing gas in an area of high turbulence. The reformable fuel and the oxygen-containing gas can mix further as they flow downstream through the tube where the mixture, i.e., a gaseous reforming reaction mixture, also can experience a rifling or twisting effect. Subsequently, the mixture of reformable fuel and oxygen-containing gas can exit the tube at its outlet.

The widening of the internal diameter of the tube downstream from the throat can vary considerably depending on many factors including the internal diameter (and/or volume) of the tube in that section, the length of the downstream section of the tube from the throat, the reformable fuel intended to be used, and various other factors. If a sensor assembly such as a pressure tap (e.g., as part of a differential pressure measurement assembly) is located in this section of the tube (not shown in figures), laminar flow of the fluid stream is desired to maintain a good signal for pressure measurement (or other characteristics being measured). That is, as fluid flows through the tube, localized effects can disrupt laminar flow such as flow separation along the internal walls of the tube where a boundary layer can be present. Such effects as well as others can cause random signal noise to be measured thereby obscuring the true values of the parameter or characteristic being measured. Signal averaging can be used to minimize such effects, especially when combined with good secondary calibration.

However, to maintain a laminar or substantially laminar flow of the oxygen-containing gas stream and the mixture of the same with a reformable fuel, the widening or increase in internal diameter of the tube downstream from the throat should be at an angle less than or equal to about 15° as measured from the longitudinal axis through the tube. In various embodiments, the widening or increase in internal diameter of the tube downstream from the throat should be at an angle less than or equal to about 14°, about 13°, about 12°, about 11°, about 10°, about 9°, about 8°, about 7°, about 6°, about 5° or less as measured from the longitudinal axis through the tube.

The taper or narrowing of the interior diameter of the tube upstream from the throat can vary considerably depending on many factors including those discussed above in relation to the downstream portion of the tube and whether a helical mixing structure is present on the internal wall of the tube in this section or portion of the tube. However, the taper of the internal diameter of the tube on the upstream portion of fluid mixing device from the inlet to the throat generally is less sensitive than the widening downstream from the throat and can be of an angle greater than those described above.

As shown in FIG. 1A, the fluid mixing device includes two pressure taps. The pressure taps are located so that the pressure of the oxygen-containing gas stream through the tube can be measured at its highest valve before the throat and at its lowest valve while in the throat to more accurately calculate the pressure differential prior to introduction of a reformable fuel into the oxygen-containing gas stream. It should be understood that the pressure taps and/or other sensor assemblies can be located elsewhere along the tube or in addition to the depicted locations of the pressure taps. For example, the location of a second pressure tap for a differential pressure measurement can be upstream from the throat or directly adjacent to the flat face of the outlet of the throat such as directly upstream of the outlet of the throat.

As described herein, the reformable fuel introduced into the tube and the oxygen-containing gas stream can be a gaseous reformable fuel or a liquid reformable fuel. A gaseous reformable fuel can be introduced from a pressurized container or apparatus and/or a container of compressed gaseous reformable fuel, for example, a tank of propane or butane. In various embodiments of the present teachings, a source of positive gaseous pressure can assist in the delivery of a reformable fuel to the fuel inlet(s) of a tube and/or into the oxygen-containing gas stream. A gaseous reformable fuel also can be heated prior to introduction into an oxygen-containing gas stream.

A liquid reformable fuel can be vaporized prior to introduction into the oxygen-containing gas stream such that a vaporized liquid reformable fuel can be introduced into the oxygen-containing gas stream similar to that of a gaseous reformable fuel. A vaporized liquid reformable fuel can be heated after vaporization until delivery into the oxygen-containing gas stream so as to maintain its vaporized state.

A liquid reformable fuel can be introduced directly into the oxygen-containing gas stream through the tube. In such cases, a liquid pump can be used to pressurize and/or deliver the liquid reformable fuel to the fuel inlets of the tube and into the oxygen-containing gas stream. A liquid reformable fuel can be heated prior to its introduction into the oxygen-containing gas stream so as to facilitate the vaporization of the liquid reformable fuel in the turbulent mixing zone downstream from the throat of the tube. The increase in volume and surface area experienced by a liquid reformable fuel entering the interior of the tube downstream from the throat can assist in creating a vaporous liquid reformable fuel. Accordingly, a heated liquid reformable fuel entering a turbulent section of the tube and experiencing an increase in volume and surface area, and optionally a helical mixing structure, can be vaporized sufficiently to provide with the oxygen-containing gas stream a gaseous reforming reaction mixture suitable for delivery to a reformer of a fuel cell unit or fuel cell system.

Figure 1B:
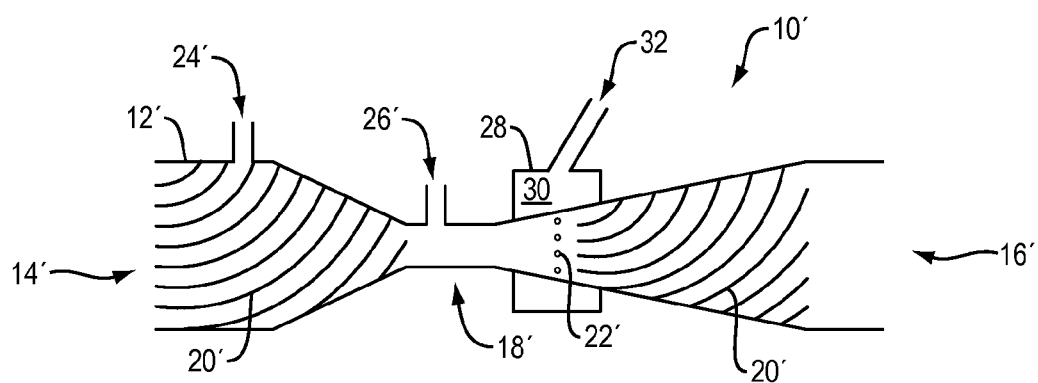
FIG. 1B is a schematic diagram of a cross-sectional view of an embodiment of a fluid mixing device of the present teachings having a collar surrounding a plurality of fuel inlets and helical mixing structure upstream and downstream from the throat portion of the device.

FIG. 1B is a schematic diagram of an embodiment of a fluid mixing device of the present teachings similar to the fluid mixing device of FIG. 1A but including a plurality of fuel inlets and a collar associated therewith. FIG. 1B also includes a helical mixing structure associated with the internal wall of the tube upstream from the throat.

Referring now to FIG. 1B, the fluid mixing device 10' includes a tube 12' having an inlet 14' and an outlet 16'. The fluid mixing device 10' has a throat 18' located between the inlet 14' and the outlet 16'. The fluid mixing device includes a helical mixing structure 20' on the internal wall of the tube, both upstream and downstream from the throat 18'. The fluid mixing device includes a plurality of fuel inlets 22', depicted as a series of holes around the circumference of the tube 12'. The fluid mixing device includes a collar 28 encompassing the plurality of fuel inlets. The collar along with the tube creates a fuel injection chamber 30, which is in fluid communication with a fuel source inlet 32. The depicted fluid mixing device also includes a first pressure tap 24' and a second pressure tap 26'.

The operation of the fluid mixing device in FIG. 1B can be similar to the operation of the fluid mixing device in FIG. 1A, for example, the general flow and mixing of fluids therethrough and the types and/or sources of reformable fuel. However, the reformable fuel is introduced into the oxygen-containing gas stream in a different manner. That is, rather than a single fuel inlet, a series of holes are present around the circumference of the tube, which holes provide fluid communication between the exterior and the interior of the tube. The number and size of the holes can vary depending on a particular application, the reformable fuel(s) expected to be used, the size and design of the internal walls and diameters of the tube, and various other parameters. In addition, the fuel inlets can include more than one series of holes around the circumference or can be only partially encircling the tube.

In the depicted device, a collar is present around the tube, encompassing the fuel inlets and isolating them from the ambient environment exterior to the tube. A collar can be connected to, for example, bonded or welded, to the exterior of the tube so as to create a fluid-tight seal between the two structures, which also can withstand higher pressures when a pressurized reformable fuel is passed therethrough. A collar can form a fluid-tight seal with the tube and/or device using a sealing member such as an O-ring as shown later in FIGS. 1E and 1F. Alternatively, a collar can be integral with the tube, for example, the tube can be manufactured as a one-piece design. The collar and the tube together can create a fuel injection chamber, which is in fluid communication with the fuel source inlet (and a source of reformable fuel) and the interior of the tube. Although in the depicted fluid mixing device fluid communication is present among the fuel source inlet, fuel injection chamber, fuel inlets and the interior of the tube, one or more of these structure can be in operable fluid communication with the other structure(s) with the use of a valve assembly or other appropriate fluid flow controlling device or structure.

In operation, a reformable fuel such as a pressurized and/or heated reformable fuel can be introduced through the fuel source inlet into the fuel injection chamber and subsequently through the fuel inlets into the oxygen-containing gas stream moving downstream through the tube. Because the series of holes around the circumference of the tube are located downstream from the throat, the reformable fuel can be introduced at a turbulent zone of the fluid mixing device to promote mixing with the oxygen-containing gas stream so that uniformity of the resulting composition can be achieved, for example, a homogenous gaseous reforming reaction mixture. As the internal diameter of the tube increases downstream from the throat, the turbulence can decrease as well. Accordingly, to introduce the reformable fuel into the oxygen-containing gas stream at its highest velocity, the distance from the downstream end of the throat to the fuel inlet(s) should be minimized.

In addition, the use of many small diameter holes and/or various patterns of holes as fuel inlets can assist in the atomization and/or vaporization of a liquid reformable fuel delivered through such a device. For example, many small diameter holes can effect the spraying of a fine mist of a heated liquid reformable fuel into the turbulent oxygen-containing gas stream at a location of increasing volume and surface area, which mixture then can encounter a helical mixing structure to further enhance the mixing of the fluid components.

In various embodiments of fluid mixing devices of the present teachings, an internal wall of the tube upstream from the throat can include a helical mixing structure as shown in FIG. 1B. A helical mixing structure in this section or portion of the device can assist in creating a turbulent flow of the oxygen-containing gas stream prior to its introduction to the throat. That is, the oxygen-containing gas can be rifling, twisting or spinning before reaching the throat and prior to the introduction of a reformable fuel. A helical mixing structure located between an inlet of the device and its throat can be have the same or opposite direction of rotation as a helical mixing structure located between the throat and the outlet of the tube. Whether the direction of rotation is the same or opposite, each helical mixing structure can have the same or a different degree of twist, i.e., the distance between each twist of a helical mixing structure. Indeed, the degree of twist can vary for a helical mixing structure along its longitudinal axis, for example, from the throat towards the outlet.

It should be understood that the internal wall of a throat can include a helical mixing structure. In certain embodiments, the length of the throat can be minimized such that having a helical mixing structure present in the throat is impractical. Nevertheless, such a helical mixing structure can be desired regardless of the length of the throat.

When one or more sections or portions of an internal wall of a tube include a helical mixing structure and pressure taps or a differential pressure measurement assembly are present in such sections or portions, the pressure taps can be located in the same channel of the helical mixing structure, for example, the same channel of rifling, to improve the accuracy of measurements therefrom.

Figure 1C:
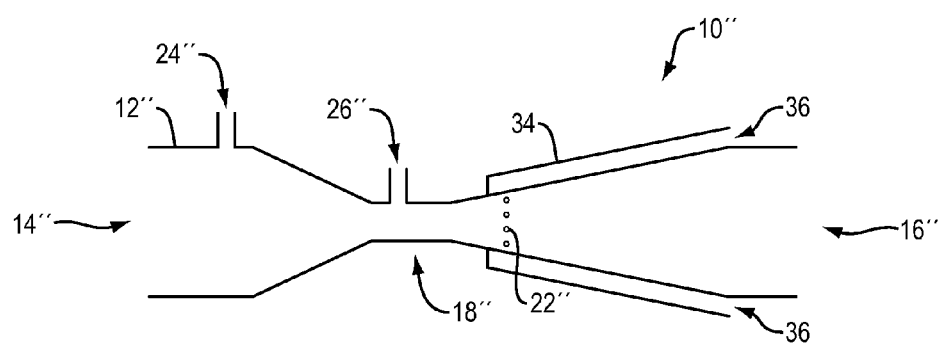
FIG. 1C is a schematic diagram of a cross-sectional view of an embodiment of a fluid mixing device of the present teachings having a plurality of fuel inlets and a fuel source tube and fuel injection channel downstream from the throat portion of the device.

FIG. 1C is a schematic diagram of an embodiment of a fluid mixing device of the present teachings similar to the fluid mixing devices of FIGS. 1A and 1B but without a helical mixing structure and a collar but including a fuel source tube concentric to the tube.

Referring now to FIG. 1C, the fluid mixing device 10" includes a tube 12" having an inlet 14" and an outlet 16". The fluid mixing device 10" has a throat 18" located between the inlet 14" and the outlet 16". The fluid mixing device includes a plurality of fuel inlets 22", depicted as a series of holes substantially perpendicular to the longitudinal axis of the tube around the circumference of the tube 12". The fluid mixing device includes a fuel source tube 34 concentric to the exterior surface of the tube 12" downstream from the throat 18". The fuel source tube and the tube are spaced apart and create a fuel injection channel 36, which is in fluid communication with the fuel inlets 22" and a source of reformable fuel (not shown) through a fuel source inlet (not shown). The depicted fluid mixing device also includes a first pressure tap 24" and a second pressure tap 26".

The interior surface of a fuel source tube and the corresponding exterior surface of a tube are spaced apart to create a fuel source channel therebetween. Such a design has a similar goal as the fuel injection chamber formed by a collar and the tube, i.e., to create fluid communication, for example, operable fluid communication, between a source of reformable fuel and the interior of the tube through the fuel inlet(s). The manufacture of such a device also can be similar to that of a tube with a collar in that the fuel source tube can be connected or secured to the tube or can be made to be integral with the tube, for example, being formed as part of the same manufacturing process. Although a design using a fuel source tube can include a collar as described herein, the use of a fuel source tube can avoid the need of a collar.

A fuel source tube can be concentric to the exterior surface of a tube at least upstream of the fluid inlets so as to create a fuel injection channel that is in fluid communication with the fuel inlets. The concentric fuel source tube continues towards the outlet of the tube to create the fuel injection channel for the introduction of a reformable fuel into the interior of the tube. In such a design, a reformable fuel (in the various forms and from the various sources) can be delivered to the fuel inlets, flowing adjacent to the exterior of the tube and in the opposite direction of the flow of the oxygen-containing gas stream and mixture including reformable fuel in the interior of the tube. That is, the reformable fuel can be envisioned as being wrapped around the tube where the reformable fuel can be in thermal communication with the interior of the tube containing a heated oxygen-containing gas stream and a gaseous reforming reaction mixture. As such, the design can act as a counter-flow heat exchanger to maintain or increase the temperature of the reformable fuel before it enters the oxygen-containing gas stream.

Figure 1D:
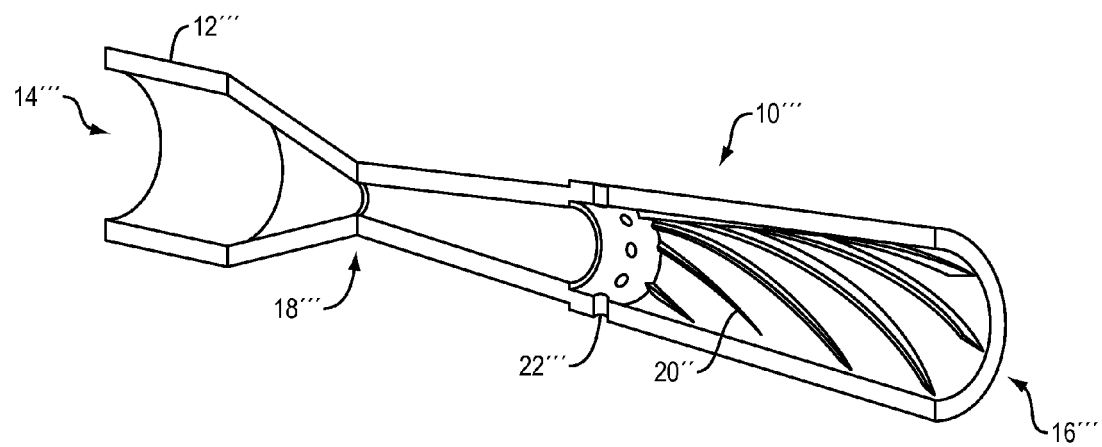
FIG. 1D is a schematic diagram of a cross-sectional perspective view of an embodiment of a fluid mixing device of the present teachings having a plurality of fuel inlets and helical mixing structure downstream from the fuel inlets.

FIG. 1D is a schematic diagram of a cross-sectional perspective view of an embodiment of a fluid mixing device of the present teachings similar to the fluid mixing device of FIG. 1B but without a collar, pressure taps, or a helical mixing structure upstream from the throat.

Referring now to FIG. 1D, the fluid mixing device 10''' includes a tube 12''' having an inlet 14''' and an outlet 16'''. The fluid mixing device 10''' has a throat 18''' located between the inlet 14''' and the outlet 16'''. The fluid mixing device includes a plurality of fuel inlets 22''', depicted as a series of holes substantially perpendicular to the longitudinal axis of the tube around the circumference of the tube 12'''. The fluid mixing device includes a helical mixing structure 20" depicted as triangular projections from the internal wall into the interior of the tube.

As can be seen in FIG. 1D, the throat portion of the tube can be minimal or have a short length compared to its diameter. In addition, the fluid communication between the interior and exterior of the tube through the fuel inlets readily can be seen along with the projection of the helical mixing structure into the interior of the tube. The device shown in FIG. 1D can be equipped with a collar or with a fuel source tube.

Figure 1E:
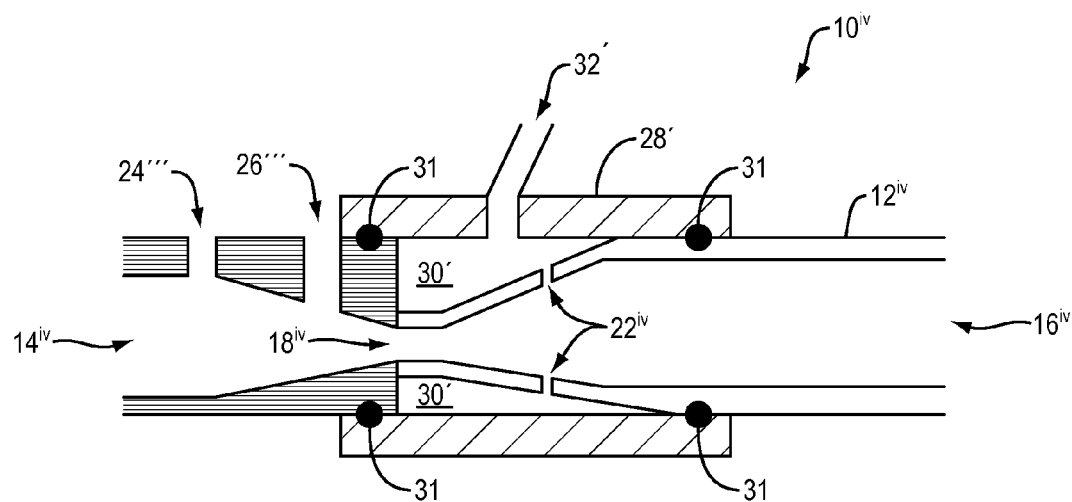
FIG. 1E is a schematic diagram of an enlarged cross-sectional view of an embodiment of a fluid mixing device of the present teachings having a collar surrounding a plurality of fuel inlets, where the collar resides on two O-rings.

FIG. 1E is a schematic diagram of an enlarged cross-sectional view of an embodiment of a fluid mixing device of the present teachings where a collar resides on two O-rings and creates with the tube a fuel injection chamber surrounding a plurality of fuel inlets.

Referring now to FIG. 1E, the fluid mixing device $10^{iv}$ includes a tube $12^{iv}$ having an inlet $14^{iv}$ and an outlet $16^{iv}$. The fluid mixing device $10^{iv}$ has a throat $18^{iv}$ located between the inlet $14^{iv}$ and the outlet $16^{iv}$. The fluid mixing device includes a plurality of fuel inlets $22^{iv}$, depicted as a series of holes around the circumference of the tube $12^{iv}$. The fluid mixing device includes a collar 28' encompassing the plurality of fuel inlets $22^{iv}$, where the collar 28' resides on two O-rings 31 to form a fluid-tight seal. The collar 28' along with the exterior of the tube $12^{iv}$ creates a fuel injection chamber 30', which is in fluid communication with a fuel source inlet 32'. The depicted fluid mixing device also includes a first pressure tap 24''' and a second pressure tap 26'''.

The operation of the fluid mixing device in FIG. 1E can be similar to the operation of the fluid mixing device in FIG. 1B, for example, the general flow and mixing of fluids therethrough and the types and/or sources of reformable fuel. However, the fluid mixing device shown in FIG. 1E has a collar that can be slid over the structure forming the tube and into position to create a fuel injection chamber that is in fluid communication with the fuel inlets. O-rings or other sealing members can be used to create a fluid-tight seal between the collar and the structure of the fluid mixing device. In the depicted example, the portion of the tube that is upstream from the throat is created in a block of material, for example, a cylindrical piece of metal, whereby the block can define the tube in that location. As such, the diameter of the block of material can be the same as a diameter of a portion of the tube downstream from the throat so that a cylindrical collar can snuggly fit around both sections, with the sealing members creating a fluid-tight seal.

Figure 1F:
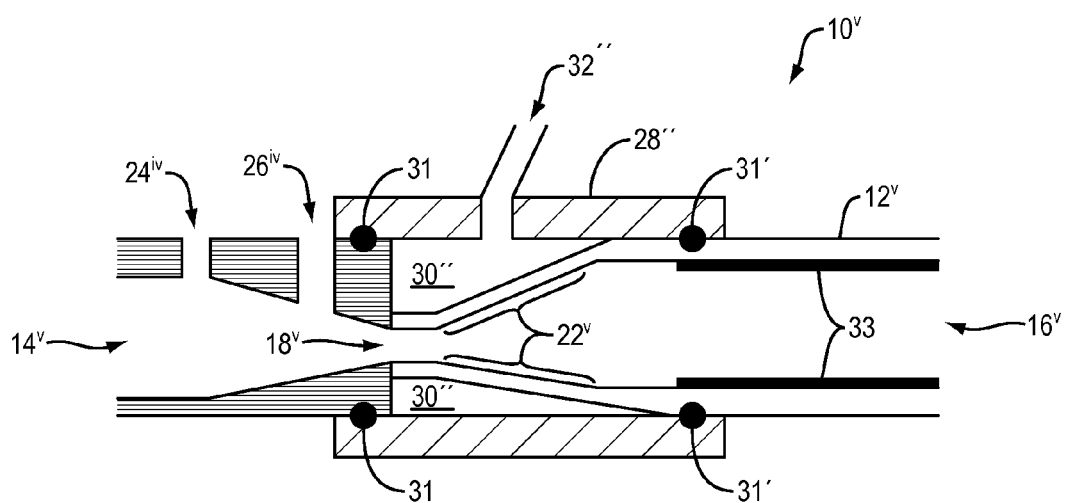
FIG. 1F is a schematic diagram of an enlarged cross-sectional view of an embodiment of a fluid mixing device of the present teachings having a collar surrounding a porous barrier defining the fuel inlets, where the collar resides on two O-rings.

FIG. 1F is a schematic diagram of an enlarged cross-sectional view of an embodiment of a fluid mixing device of the present teachings where a collar resides on two O-rings and creates with the tube a fuel injection chamber. The fuel inlets of this device are defined by a porous barrier that is the wall of the tube in the region of the fuel injection chamber.

Referring now to FIG. 1F, the fluid mixing device $10^v$ includes a tube $12^v$ having an inlet $14^v$ and an outlet $16^v$. The fluid mixing device $10^v$ has a throat $18^v$ located between the inlet $14^v$ and the outlet $16^v$. The fluid mixing device includes a plurality of fuel inlets, depicted as a porous barrier $22^v$ that is a wall of the tube $12^v$ that forms a surface of the fuel injection chamber 30". The fluid mixing device includes a collar 28" encompassing the porous barrier $22^v$, where the collar 28" resides on two O-rings 31' to form a fluid-tight seal. The collar 28" along with the exterior of the tube $12^v$ creates a fuel injection chamber 30", which is in fluid communication with a fuel source inlet 32". The internal wall of the tube $12^v$ includes a reforming catalyst 33 located downstream from the throat and after the porous barrier (fuel inlets) $22^v$. The depicted fluid mixing device also includes a first pressure tap $24^{iv}$ and a second pressure tap $26^{iv}$.

The construction of the collar and the tube arrangement can be similar for FIGS. 1E and 1F. However, a porous barrier is created in or by the wall of the tube in FIG. 1F, for example, at least where the wall of the tube corresponds to the fuel injection chamber. The porous barrier is the fuel inlet(s) for the device whereby reformable fuel and/or steam can be introduced into the fuel injection chamber via the fuel source inlet. The reformable fuel and/or steam typically is pressurized during delivery such that the pressure differential between the fuel injection chamber and the corresponding section of the interior of the tube provides a driving force to move the reformable fuel and/or steam through the porous barrier into the high velocity stream of oxygen-containing gas and/or stream passing through the tube.

Where a ceramic is used to create the porous barrier, it can be efficient to use a ceramic to create the entire downstream portion of the tube from the throat, optionally including the throat. In various manufacturing techniques, an appropriate ceramic structure can be cast onto a throat or a portion thereof extending from a block of material defining the upstream portion of the tube from the throat as shown in the figure. The ceramic can be cast to provide a porous barrier (or wall) in the appropriate location and a fluid-tight wall further downstream (and upstream depending on the design and length of the porous barrier (fuel inlets). Other manufacturing techniques can be used as well, such as spraying a ceramic slurry onto a rotating spindle, where the composition of the ceramic slurry can be changed during manufacture so as to create porous and non-porous (fluid-tight) wall sections.

The use of a ceramic to create at least the downstream portion of the tube can have other advantages. For example, as shown in FIG. 1F, a reforming catalyst can be coated on and/or impregnated in the wall of the tube in such a location. Accordingly, the reforming of a gaseous reforming reaction mixture can begin in the fluid mixing device before delivery to a reformer and/or a fuel cell stack to increase the efficiency and/or effectiveness of the reforming process. The reforming reaction can produce heat, which can be used to heat a reformable fuel and/or water or steam prior to introduction into the interior of the tube (see, e.g., the device in FIG. 1C, where a fuel injection channel can coincide with a section of internal wall having a reforming catalyst associated therewith as shown in FIG. 1F).

Figure 1G:
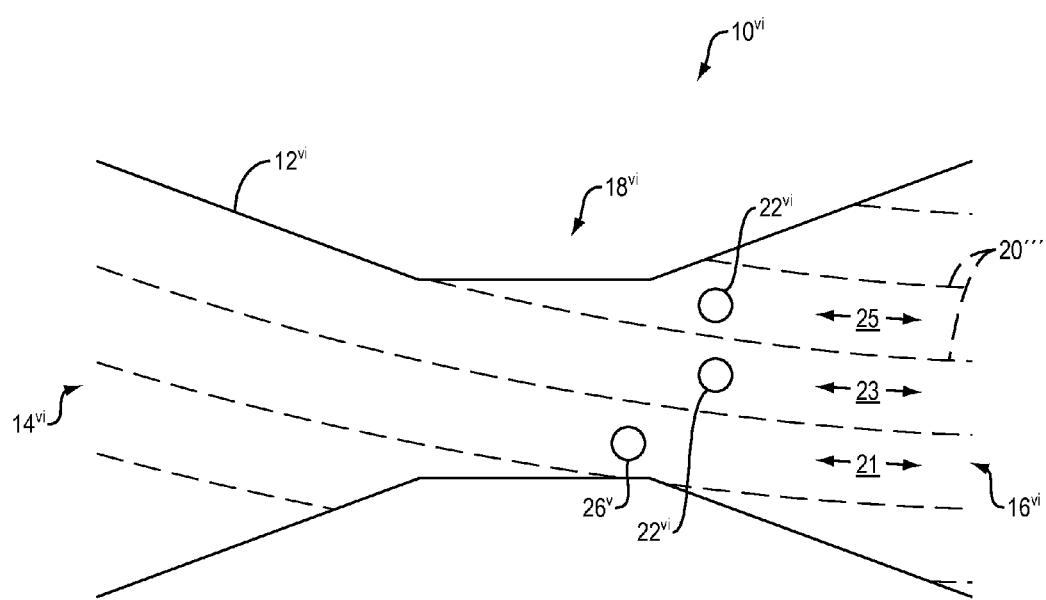
FIG. 1G is a schematic diagram of an enlarged exterior view of a throat region of an embodiment of a fluid mixing device of the present teachings where a pressure tap and fuel inlets are located adjacent the flat face of the outlet of the throat but in different independent rifling channels formed by a helical mixing structure (dashed lines) on the internal walls of the tube.

FIG. 1G is a schematic diagram of an enlarged exterior view of a throat region of an embodiment of a fluid mixing device where a pressure tap and fuel inlets are located adjacent the outlet of the throat but in different independent rifling channels. The independent rifling channels are formed by a helical mixing structure (dashed lines) on the internal walls of the tube.

Referring now to FIG. 1G, the fluid mixing device $10^{vi}$ includes a tube $12^{vi}$ having a throat $18^{vi}$ located between the inlet end $14^{vi}$ and the outlet end $16^{vi}$. A helical mixing structure 20''' (shown in dashed lines) through the interior of the tube $12^{vi}$ creates independent rifling channels 21, 23, 25 that propagate through the tube $12^{vi}$. The tube $12^{vi}$ also includes fuel inlets $22^{vi}$ and a pressure tap $26^v$. As shown, the fuel inlets $22^{vi}$ are associated with or coincide with independent rifling channels 23, 25 that are distinct from or independent of the independent rifling channel 21 associated with or coinciding with the pressure tap $26^v$.

Because of a desire to minimize the distance between the downstream pressure tap and the fuel inlet(s), such a design can permit the downstream pressure tap of a differential pressure measurement assembly to be close to or directly adjacent the upstream side of the outlet of the throat and the fuel inlet(s) to be close to or directly adjacent to the downstream side of the outlet of the throat. The height of the helical mixing structure can influence the effect of such a design on the differential pressure measurement and how close a downstream pressure tap and the fuel inlets can be to each other and/or the flat face of the outlet of the throat.

In other words, to maximize the pressure differential between the upstream pressure tap (located closer to the inlet of the tube) and the downstream pressure tap, the downstream pressure tap can be placed near or along the throat. To introduce reformable fuel near or at the point of highest velocity of the stream of oxygen-containing gas through the tube, the fuel inlet(s) should be placed as close to the outlet of the throat but without interfering with or minimizing the interference of the pressure measurement at the downstream pressure tap. A helical mixing structure that permits the pressure taps to be in an independent rifling channel without a fuel inlet (i.e., the fuel inlet(s) can be associated with or in different independent rifling channel(s)) can enable the distance (along the longitudinal axis through the tube) between the downstream pressure tap and the fuel inlet(s) to be minimized. Depending on the height of the helical mixing structure and other fluid flow characteristics, the fuel inlet(s) can be at an equal distance or upstream of the downstream pressure tap such that the fuel inlet(s) can be in the maximum velocity of fluid flow region of fluid mixing device.

Figure 2A:
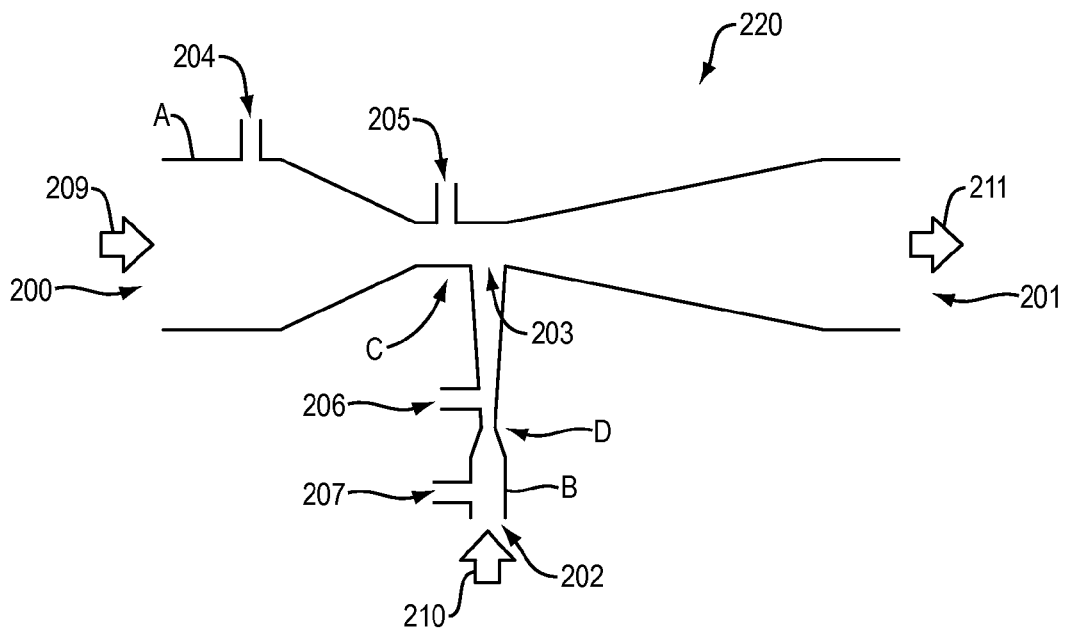
FIG. 2A is a schematic diagram of cross-sectional view of an embodiment of a fluid mixing device of the present teachings having a second tube for introducing reformable fuel into the tube, where the second tube intersects the throat of the tube.

FIG. 2A shows an exemplary fluid mixing device of the present teachings 220. The device includes a first tube A for receiving a flow of a first fluid 209 and a second tube B for receiving a flow of a second fluid 210. The first tube has an inlet 200, a throat portion C, and an outlet 201. The second tube B has an inlet 202, a throat portion D, and an outlet 203 (which coincides with a fuel inlet of the first tube A).

The second tube discharges the flow of the second fluid 210 into the throat portion C of tube A while a flow of the first fluid 209 is passing through the throat portion C. In such embodiments, the flow of the first fluid 209 can be determined by measuring the difference in pressure between pressure taps 204 and 205. Additionally, the flow of the second fluid 210 can be determined by measuring the difference in pressure between pressure taps 206 and 207. In such embodiments, the first tube and the second tube intersect at the throat C. The fluid flows can meet and mix at the point of highest velocity and lowest pressure of the flow of the first fluid 209 and lower velocity and higher pressure of the flow of the second fluid 210. The mixed fluid 211 flows through outlet 201. Consequently, the device can mix a reformable fuel and an oxygen-containing gas while simultaneously and independently measuring the flow characteristics of both fluidic streams without measurement interruption.

Figure 2B:
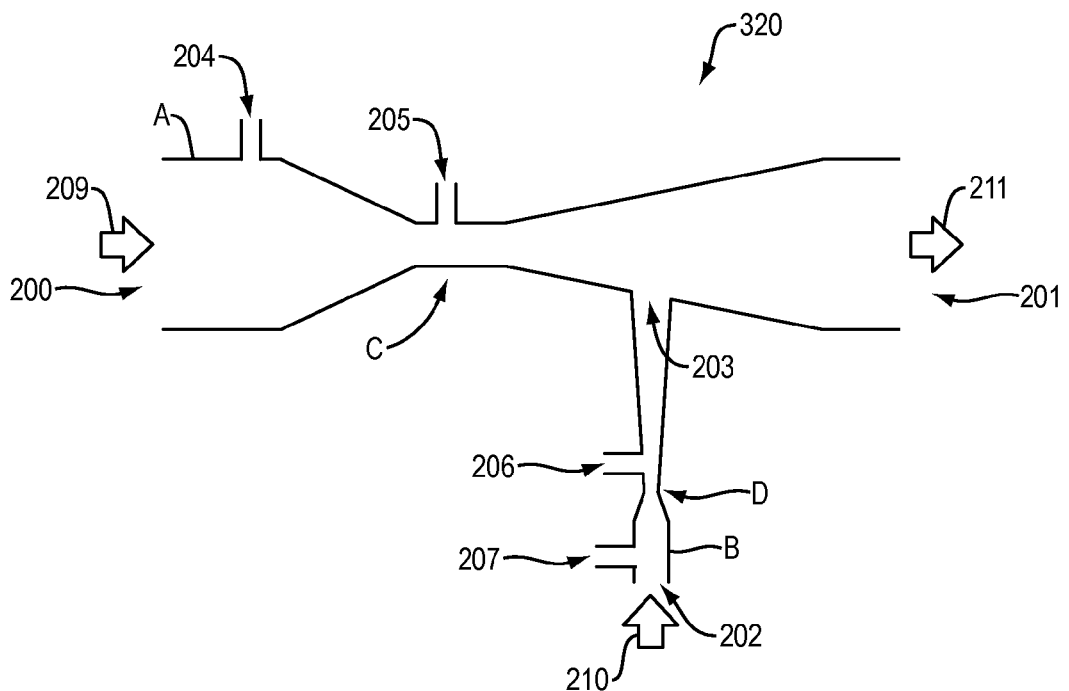
FIG. 2B is a schematic diagram of cross-sectional view of an embodiment of a fluid mixing device of the present teachings having a second tube for introducing reformable fuel into the tube, where the second tube intersects the tube downstream from its throat.

FIG. 2B shows another embodiment of a fluid mixing device of the present teachings 320. The embodiment of FIG. 2B is similar to the embodiment shown in FIG. 2A, and like parts have been given like reference numerals. A difference between the embodiments of FIGS. 2A and 2B is the location of the intersection between the first tube A and the second tube B. As shown in FIG. 2B, the second tube B intersects the first tube A at a location downstream (or distal to) the throat C of the first tube.

A comparison of FIG. 2A to FIG. 2B illustrates that the location of intersection of tubes A and B can be shifted anywhere along the length of the first tube (i.e., the horizontal tube). As such, the outlet of second tube can be located anywhere along the length of the first tube provided that the flow rate through the first tube can be measured. For example, the outlet of the second tube can be at any location distal to tap 205 towards the outlet of the first tube. However, the distance between the downstream end of the throat of the first tube and the outlet of the second tube should be minimized for maximum turbulence during mixing.

Figure 2C:
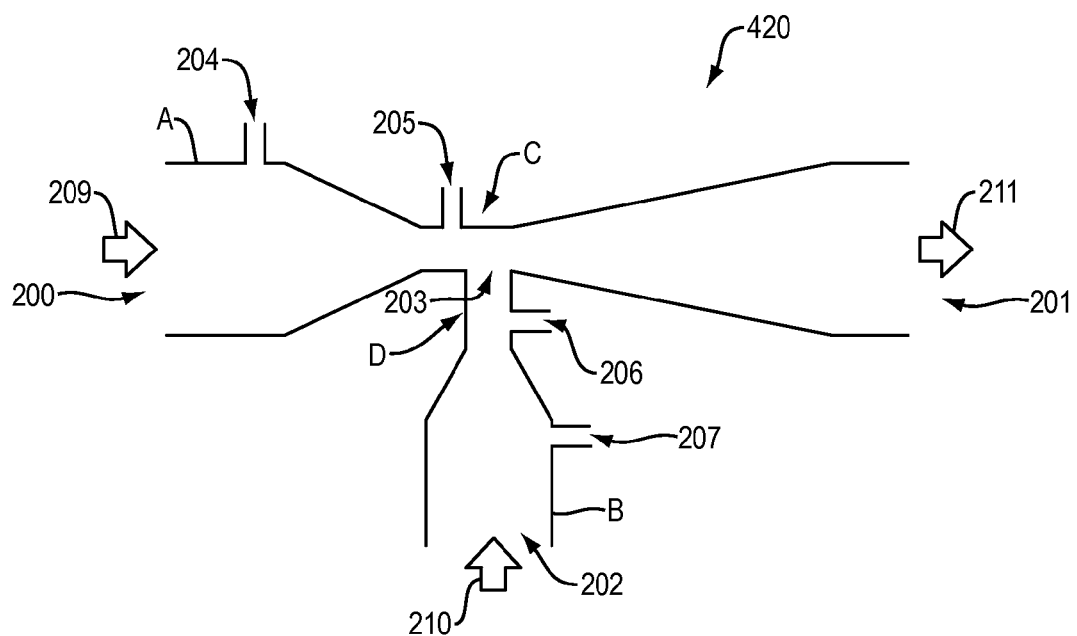
FIG. 2C is a schematic diagram of cross-sectional view of an embodiment of a fluid mixing device of the present teachings having a second tube for introducing reformable fuel into the tube, where the throat of the second tube intersects the throat of the tube.

FIG. 2C shows another embodiment of a fluid mixing device 420 of the present teachings. The embodiment of FIG. 2C is similar to the embodiment shown in FIG. 2A, and like parts have been given like reference numerals. A difference between the embodiments of FIGS. 2A and 2C is that the throat portion D of the second tube B in FIG. 2C intersects with the first tube A such that the outlet 203 of the second tube B includes the throat D of the second tube B. This allows for mixing of the fluids at a location in which both fluids are at their highest flow velocity, thereby allowing for thorough mixing of the fluids.

Figure 2D:
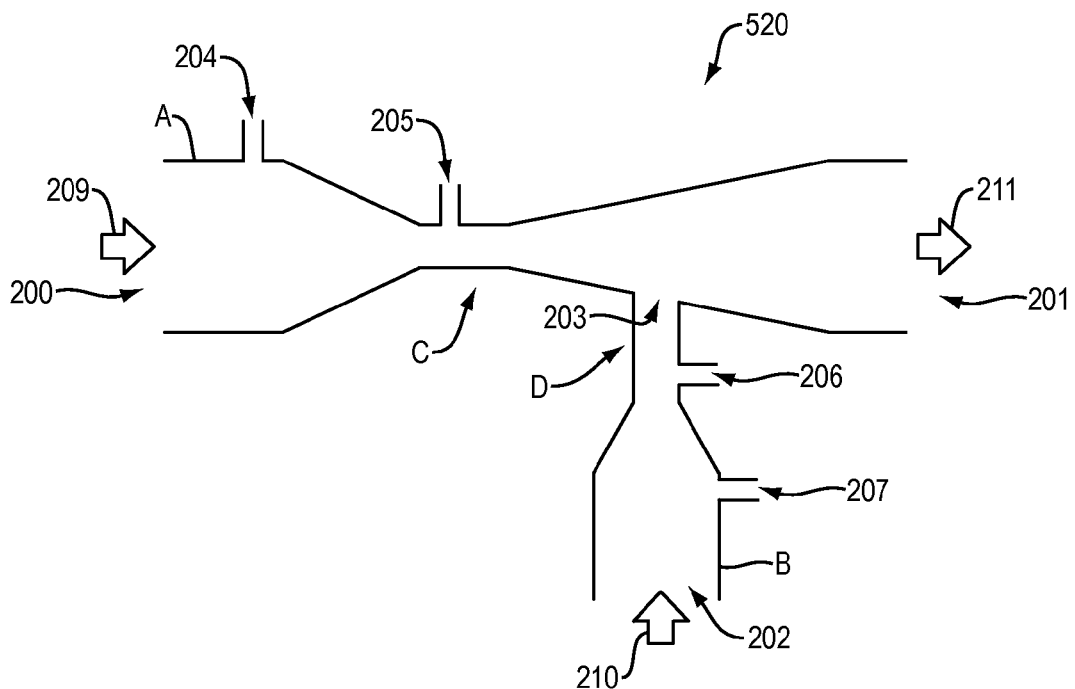
FIG. 2D is a schematic diagram of cross-sectional view of an embodiment of a fluid mixing device of the present teachings having a second tube for introducing reformable fuel into the tube, where the throat of the second tube intersects the tube downstream from its throat.

FIG. 2D shows another embodiment of a fluid mixing device of the present teachings 520, and like parts have been given like reference numerals. The embodiment depicted in FIG. 2D is similar to FIG. 2C, except that the second tube B intersects the first tube A at a location in the widening portion of increasing internal diameter of the first tube downstream from the throat C. In this region, the first fluid flow has a velocity between the velocity immediately downstream and adjacent to the throat C and the outlet 201.

A comparison of FIGS. 2A and 2B to FIGS. 2C and 2D illustrates that the location of intersection of the outlet of the second tube can be shifted along the length of the second tube B, thereby intersecting the first tube A with the throat D of the second tube or with an outlet of the second tube that is downstream from its throat D. Accordingly, in the fluid mixing devices of the present teachings, the length of the throat and/or the portion of the tube downstream from the throat can be varied. Moreover, the diameter of the outlet of the second tube can be varied.

Figure 2E:
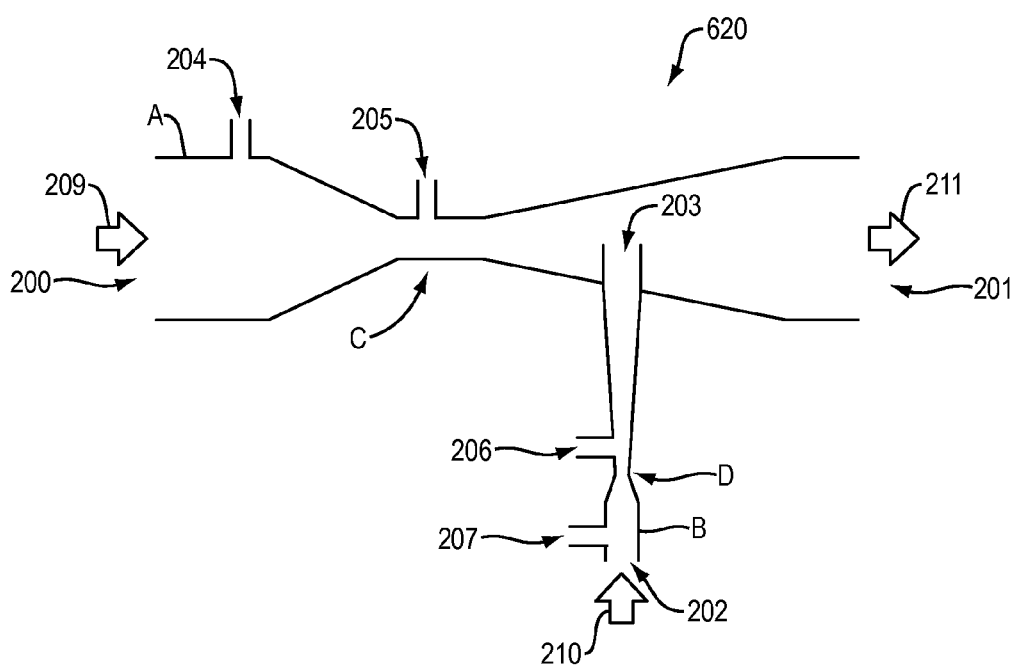
FIG. 2E is a schematic diagram of cross-sectional view of an embodiment of a fluid mixing device of the present teachings having a second tube for introducing reformable fuel into the tube, where the second tube intersects the tube downstream from its throat and the outlet of the second tube is in the interior of the tube.

FIG. 2E shows another embodiment of a fluid mixing device of the present teachings 620. The embodiment of FIG. 2E is similar to the embodiment shown in FIG. 2B, and like parts have been given like reference numerals. A difference between the embodiments of FIGS. 2E and 2B is the location of the outlet of the second tube B. As shown in FIG. 2E, the outlet 203 of the second tube B is in the interior of the first tube A. Such a design can enhance or otherwise provide a desired mixing.

In each of FIGS. 2A-2E, the longitudinal axis through the second tube B can be non-perpendicular to the longitudinal axis through the first tube A. That is, the longitudinal axis through the second tube can be angled greater than 90° or less than 90° in relation to the longitudinal axis through the first tube A (e.g., towards the throat) to increase the mixing of the incoming reformable fuel and the fluid stream through the first tube A.

Figure 2F:
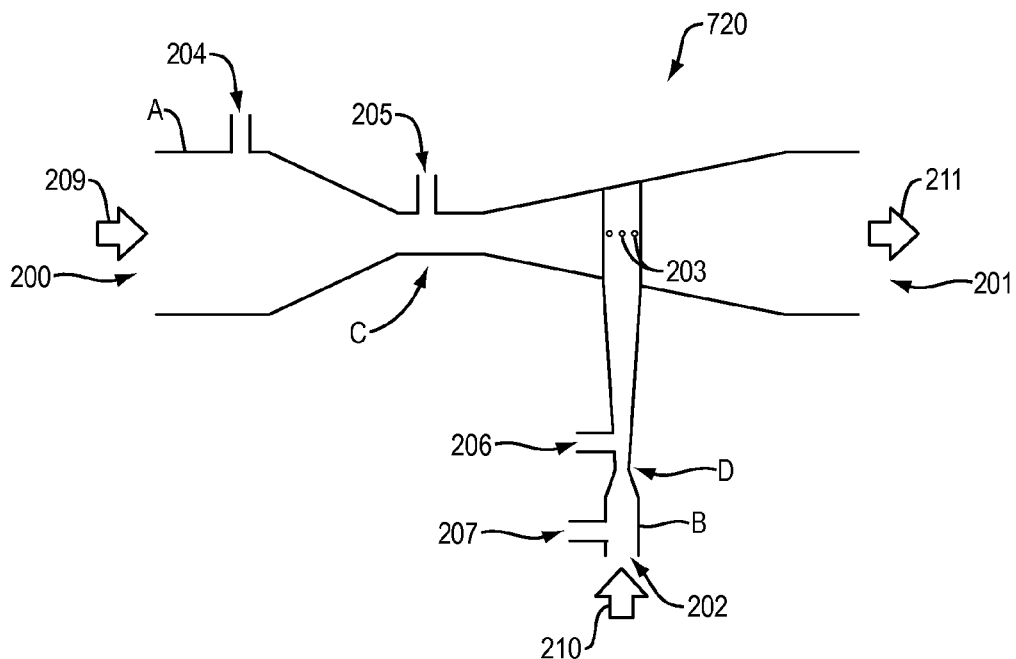
FIG. 2F is a schematic diagram of cross-sectional view of an embodiment of a fluid mixing device of the present teachings having a second tube for introducing reformable fuel into the tube, where the second tube intersects the tube downstream from its throat and has a closed end, where the outlet of the second tube is defined by a series of holes along the longitudinal axis through the tube.

FIG. 2F shows another embodiment of a fluid mixing device of the present teachings 720. The embodiment of FIG. 2F is similar to the embodiment shown in FIGS. 2B and 2E, and like parts have been given like reference numerals. A difference between the embodiments of FIG. 2F and FIGS. 2B and 2E is the second tube B has a closed end, here shown as ending in contact with the internal wall of tube A across the diameter of the interior of the tube. As shown in FIG. 2F, the second tube B includes outlets 203, which are a series of holes around the circumference of the downstream portion of the first tube A at a position near the central longitudinal axis through the first tube A. Accordingly, fluids such as a reformable fuel and/or steam can be delivered through the holes to a high velocity stream of oxygen-containing gas and/or steam flowing through the first tube A.

Such a design can enhance or otherwise provide a desired mixing. For example, the outlet(s) or series of holes can have different sizes and/or patterns as described herein. The outlet(s) or series of holes also do not need to encircle the entire circumference of the second tube B as it may be desirable to delivery fluids from the second tube B only in a direction counter-to or substantially counter-to the stream of oxygen-containing gas and/or steam flowing through the first tube A for increasing the mixing of the fluids prior to contacting a catalyst along an internal wall of the first tube and/or to delivery to a reformer and/or a fuel cell stack.

Figure 3:
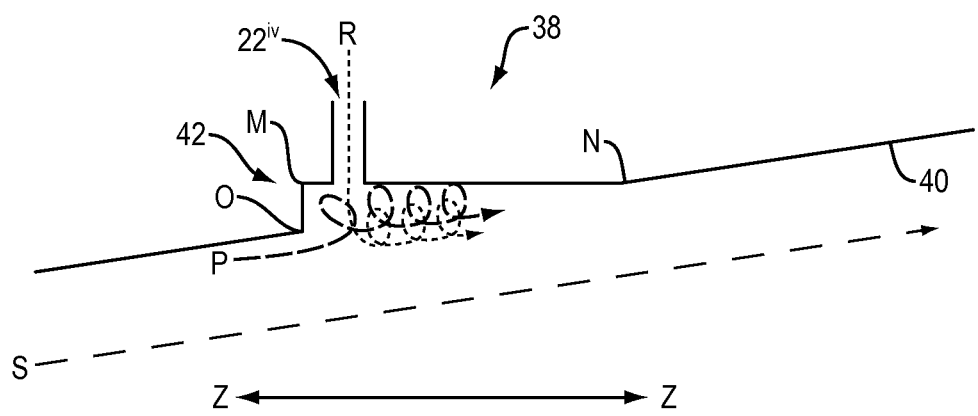
FIG. 3 is a schematic diagram of an enlarged cross-sectional view of an embodiment of an internal wall of a tube of a fluid mixing device of the present teachings having a step structure associated with a fuel inlet.

FIG. 3 is a schematic diagram of an enlarged cross-sectional view of an embodiment of an internal wall of a tube of a fluid mixing device of the present teachings having a step structure associated with a fuel inlet. Referring to FIG. 3, a step structure 38 is depicted, where the step structure is a depression or groove in an internal wall of tube 40 that begins upstream of a fuel inlet $22^{iv}$ and ends downstream of the fuel inlet $22^{iv}$. The upstream end of the step structure 42 is perpendicular or substantially perpendicular to the longitudinal axis of the tube represented by line Z-Z. The longitudinal cross-sectional shape of the depicted step structure is triangular or substantially triangular when considered along the linear line created by the internal wall of the tube 40. That is, the vertices of such a triangle are shown in FIG. 3 as M, N and O. Of course other designs, shapes and locations of step structures are included in the present teachings but are too numerous to describe.

One function of a step structure in a fluid mixing device of the present teachings can be to break the linearity of the internal wall. A step structure can create an initial, localized turbulent zone where a reformable fuel entering through a fuel inlet soon can mix with an oxygen-containing gas prior to its introduction to the bulk of the oxygen-containing gas stream, which also can be turbulent and/or twisting. Accordingly, a step structure can be thought of as a vortex generator or a facilitator of vortex generation.

Referring to FIG. 3, the path of an oxygen-containing gas stream is shown by dashed line S. As a portion of the stream along the internal wall of the tube passes the upstream end of the step structure, such portion experiences turbulence and/or twisting as it passes by the step structure as shown by bold, dashed line P. Reformable fuel (represented by the dotted line R) introduced through the fuel inlet $22^{iv}$ then is mixed with the oxygen-containing gas in the step structure or a zone nearby before being carried away in the stream of oxygen-containing gas and reformable fuel mixture, which can be twisting or rifling if a helical mixing structure is present. Consequently, the mixing of a reformable fuel and an oxygen-containing gas in this fashion can assist in providing a homogeneous gaseous reforming reaction mixture.

Figure 4:
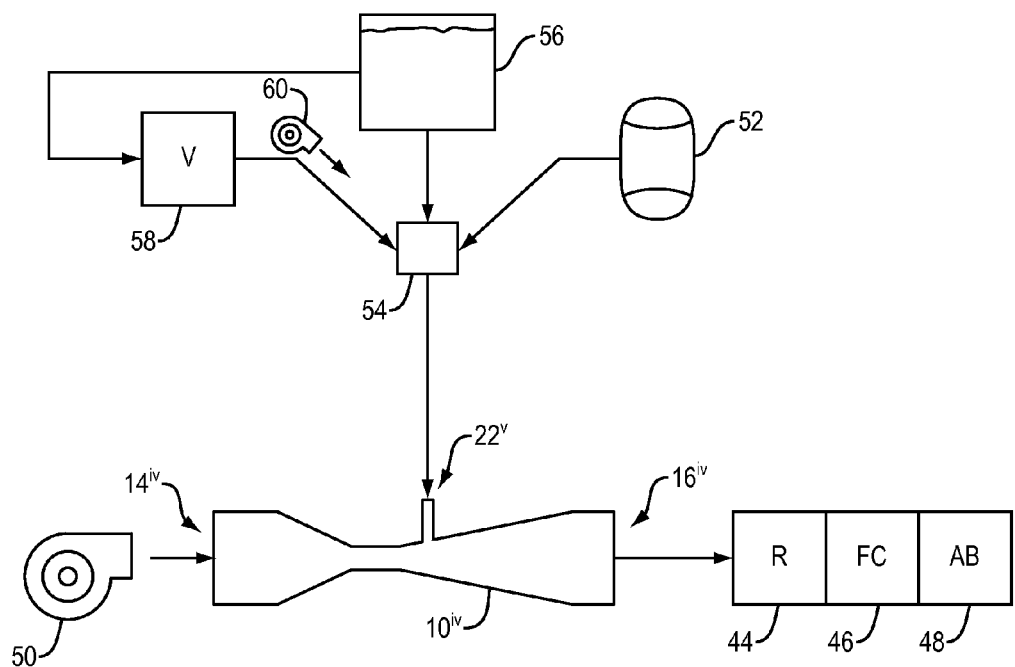
FIG. 4 is a schematic diagram of an exemplary fuel cell system incorporating a fluid mixing device of the present teachings where the reformable fuel can be a gaseous reformable fuel, a liquid reformable fuel and/or a vaporized liquid reformable fuel.

FIG. 4 is a schematic diagram of an exemplary fuel cell system incorporating a fluid mixing device of the present teachings where the reformable fuel can be a gaseous reformable fuel, a liquid reformable fuel and/or a vaporized liquid reformable fuel. Referring to FIG. 4, a general fluid mixing device of the present teachings $10^{iv}$ is shown having an inlet $14^{iv}$, an outlet $16^{iv}$ and a fuel inlet $22^v$. The fuel cell system includes a reformer 44, a fuel cell stack 46 in fluid communication with the reformer 44, and an afterburner 48 in fluid communication with the fuel cell stack 46. A source of oxygen-containing gas 50 is in fluid communication with the inlet $14^{iv}$.

FIG. 4 also depicts three different sources of reformable fuel that can be introduced to the fluid mixing device $10^{iv}$ through its inlet $22^v$. Each of the different sources can be used alone or in combination, depending on the particular application and design of the fuel cell system. More specifically, a source of gaseous reformable fuel 52 such as a tank of compressed propane can be in operable fluid communication with the inlet $22^v$ of the fluid mixing device $10^{iv}$ via a value assembly 54, which can control and manage the delivery of one or more of the sources of reformable fuel to the fluid mixing device. A source of liquid reformable fuel 56 can be in operable fluid communication with the inlet $22^v$ of the fluid mixing device $10^{iv}$ via the value assembly 54. For directly delivering a liquid reformable to the fluid mixing device, a liquid pump or a pressurizing device (not shown) can be used. The source of liquid reformable fuel 56 can be in fluid communication with a vaporizer 58. The vaporizer 58 can be in operable fluid communication with the inlet $22^v$ of the fluid mixing device $10^{iv}$ via the value assembly 54, where a source of positive gas (gaseous) pressure 60 can assist with the delivery of vaporized liquid reformable fuel to the fluid mixing device $10^{iv}$.

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

What is claimed is:

1. A fuel cell system comprising:
a fluid mixing device, the fluid mixing device comprising:
a tube having an inlet, an outlet, and a throat located between the inlet and the outlet, wherein
the throat comprises a smaller internal diameter than the internal diameter of the outlet,
the longitudinal axis through the tube from the inlet to the outlet defines a downstream direction,
at least a portion of the internal wall of the tube between the throat and the outlet comprises a helical mixing structure around at least a circumference of the tube, at least a portion of the tube between the throat and the outlet increases in internal diameter which coincides with at least a portion of the helical mixing structure, and
the tube comprises one or more fuel inlets downstream from the throat;
a collar encompassing the one or more fuel inlets on the exterior surface of the tube and creating with the tube a fuel injection chamber in fluid communication with the one or more fuel inlets, wherein the collar comprises a fuel source inlet and isolates the one or more fuel inlets from the ambient environment exterior to the tube; and
at least one of a reformer and a fuel cell stack in fluid communication with the outlet of the tube.

2. The fuel cell system of claim 1, wherein the internal wall of the tube upstream of and downstream of the throat comprises a helical mixing structure.

3. The fuel cell system of claim 1, wherein the one or more fuel inlets comprise a series of holes, the series of holes providing fluid communication between the interior of the tube and the exterior of the tube.

4. The fuel cell system of claim 1, wherein the one or more fuel inlets are defined by a porous barrier.

5. The fuel cell system of claim 1, wherein at least a portion of the tube downstream from the throat comprises a ceramic.

6. The fuel cell system of claim 1, wherein at least a portion of internal wall of the tube downstream from the throat comprises a reforming catalyst.

7. The fuel cell system of claim 1, wherein the internal diameter of the tube increases linearly or substantially linearly in the downstream direction from the throat at an angle of about 10° or less as measured along the longitudinal axis.

8. The fuel cell system of claim 1, wherein the internal wall of the tube comprises a step structure, the step structure being a depression or groove beginning upstream of the one or more fuel inlets and ending towards the outlet, and comprising one or more fuel inlets.

9. The fuel cell system of claim 1, comprising a first pressure tap and a second pressure tap, wherein each of the first pressure tap and the second pressure tap is located upstream from the one or more fuel inlets.

10. The fuel cell system of claim 1, comprising a source of oxygen-containing gas and/or steam in fluid communication with the inlet of the tube; a source of reformable fuel and/or steam in fluid communication with the one or more fuel inlets; and optionally, a source of positive gaseous pressure to deliver the oxygen-containing gas and/or steam to the inlet of and through the tube, wherein the source in communication with the inlet of the tube and the source in communication with the one or more fuel inlets are not both solely steam.

11. A fuel cell system comprising:
a fluid mixing device, the fluid mixing device comprising:
a tube having an inlet, an outlet, and a throat located between the inlet and the outlet, wherein the throat comprises a smaller internal diameter than the internal diameter of the outlet, the longitudinal axis through the tube from the inlet to the outlet defines a downstream direction, and the tube comprises one or more fuel inlets downstream from the throat;
a collar encompassing the one or more fuel inlets on the exterior surface of the tube, wherein the collar comprises a fuel source inlet in fluid communication with the one or more fuel inlets and isolates the one or more fuel inlets from the ambient environment exterior to the tube; and
at least one of a reformer and a fuel cell stack in fluid communication with the outlet of the tube.

12. The fuel cell system of claim 11, wherein at least a portion of the internal wall of the tube between the throat and the outlet comprises a helical mixing structure.

13. The fuel cell system of claim 12, wherein the internal wall of the tube comprises a step structure, the step structure being a depression or groove beginning upstream of the one or more fuel inlets and ending towards the outlet, and comprising one or more fuel inlets.

14. The fuel cell system of claim 12, wherein the helical mixing structure defines independent rifling channels on at least a portion of the internal wall of the tube between the throat and the outlet, and each fuel inlet is associated with or coincides with an independent rifling channel.

15. The fuel cell system of claim 13, wherein the one or more fuel inlets comprise a series of holes, the series of holes providing fluid communication between the interior of the tube and the exterior of the tube and being perpendicular or substantially perpendicular to the longitudinal axis of the tube.

16. The fuel cell system of claim 15, wherein the helical mixing structure defines independent rifling channels on at least a portion of the internal wall of the tube between the throat and the outlet, and each fuel inlet is associated with or coincides with an independent rifling channel.

17. The fuel cell system of claim 16, comprising a first pressure tap and a second pressure tap, wherein each of the first pressure tap and the second pressure tap is located upstream from the one or more fuel inlets.

18. The fuel cell system of claim 11, wherein at least a portion of internal wall of the tube downstream from the throat comprises a reforming catalyst.

19. The fuel cell system of claim 11, wherein the collar creates with the tube a fuel injection chamber in fluid communication with the one or more fuel inlets.

20. The fuel cell system of claim 11, wherein at least a portion of the internal wall of the tube upstream of the throat comprises a helical mixing structure and at least a portion of internal wall downstream of the throat comprises a helical mixing structure.

* * * * *